(12) United States Patent
Sun et al.

(10) Patent No.: US 10,263,735 B2
(45) Date of Patent: Apr. 16, 2019

(54) TONE BLOCK ALLOCATION FOR ORTHOGONAL FREQUENCY DIVISION MULTIPLE ACCESS DATA UNIT

(71) Applicant: MARVELL INTERNATIONAL LTD., Hamilton (BM)

(72) Inventors: Yakun Sun, Sunnyvale, CA (US); Mingguang Xu, San Jose, CA (US); Hongyuan Zhang, Fremont, CA (US); Liwen Chu, San Ramon, CA (US); Lei Wang, San Diego, CA (US); Hui-Ling Lou, Sunnyvale, CA (US); Jinjing Jiang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/337,530

(22) Filed: Oct. 28, 2016

(65) Prior Publication Data

US 2017/0063588 A1 Mar. 2, 2017

Related U.S. Application Data

(63) Continuation of application No. 14/707,898, filed on May 8, 2015, now Pat. No. 9,596,060.
(Continued)

(51) Int. Cl.
*H04W 52/02* (2009.01)
*H04L 5/00* (2006.01)
(Continued)

(52) U.S. Cl.
CPC .......... *H04L 5/0007* (2013.01); *H04L 5/0025* (2013.01); *H04L 5/0037* (2013.01);
(Continued)

(58) Field of Classification Search
None
See application file for complete search history.

(56) References Cited

U.S. PATENT DOCUMENTS 7,599,332 B2   10/2009  Zelst et al.
7,742,390 B2    6/2010  Mujtaba
(Continued)

FOREIGN PATENT DOCUMENTS

WO   WO-2012/051319   4/2012
WO   WO-2015/077223   5/2015

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

(Continued)

*Primary Examiner* — Sithu Ko

(57) ABSTRACT

For a first group of devices having a first group size, a set of block allocations is selected from a codebook. A block allocation for the first group of devices is selected from the selected set of block allocations. A corresponding integer number of different orthogonal frequency division multiplexing (OFDM) tone blocks is assigned to each device of the first group of devices according to the allocation. An orthogonal frequency division multiple access (OFDMA) data unit to be transmitted to the first group of devices via the WLAN communication channel is generated using the assigned set of OFDM tone blocks. The OFDMA data unit includes a preamble portion and a data portion, the preamble (Continued)

portion having an index to the codebook that indicates i) the first group size, and ii) the selected block allocation.

22 Claims, 12 Drawing Sheets

Related U.S. Application Data

(60) Provisional application No. 62/151,341, filed on Apr. 22, 2015, provisional application No. 62/113,744, filed on Feb. 9, 2015, provisional application No. 62/030,516, filed on Jul. 29, 2014, provisional application No. 61/990,925, filed on May 9, 2014.

(51) Int. Cl.
  H04L 27/26 (2006.01)
  H04W 84/12 (2009.01)

(52) U.S. Cl.
  CPC ........ *H04L 5/0094* (2013.01); *H04L 27/2602* (2013.01); *H04L 27/2608* (2013.01); *H04L 27/2613* (2013.01); *H04W 84/12* (2013.01)

(56) References Cited

U.S. PATENT DOCUMENTS

| | | | |
|---|---|---|---|
| 8,144,647 B2 | 3/2012 | Nabar et al. | |
| 8,149,811 B2 | 4/2012 | Nabar et al. | |
| 8,270,909 B2 | 9/2012 | Zhang et al. | |
| 8,289,869 B2 | 10/2012 | Sawai | |
| 8,363,578 B1 | 1/2013 | Ramamurthy et al. | |
| 8,472,383 B1 | 6/2013 | Banerjea et al. | |
| 8,599,803 B1 | 12/2013 | Zhang et al. | |
| 8,619,907 B2 | 12/2013 | Mujtaba et al. | |
| 8,660,497 B1 | 2/2014 | Zhang et al. | |
| 8,670,399 B2 | 3/2014 | Liu et al. | |
| 8,737,405 B2 | 5/2014 | Liu et al. | |
| 8,787,338 B2 | 7/2014 | Liu et al. | |
| 8,787,385 B2 | 7/2014 | Liu et al. | |
| 8,811,203 B1 | 8/2014 | Liu et al. | |
| 8,886,755 B1 | 11/2014 | Liu et al. | |
| 8,923,118 B1 | 12/2014 | Liu et al. | |
| 8,971,350 B1 | 3/2015 | Liu | |
| 9,215,055 B2 | 12/2015 | Chu et al. | |
| 2007/0217540 A1 | 9/2007 | Onggosanusi et al. | |
| 2008/0075058 A1 | 3/2008 | Mundarath et al. | |
| 2008/0080449 A1 | 4/2008 | Huang et al. | |
| 2008/0117867 A1 | 5/2008 | Yin et al. | |
| 2008/0192644 A1 | 8/2008 | Utsunomiya et al. | |
| 2009/0196163 A1 | 8/2009 | Du | |
| 2010/0046358 A1 | 2/2010 | van Nee | |
| 2010/0250159 A1 | 9/2010 | Hall | |
| 2010/0260159 A1 | 10/2010 | Zhang et al. | |
| 2010/0309834 A1 | 12/2010 | Fischer et al. | |
| 2011/0002219 A1 | 1/2011 | Kim et al. | |
| 2011/0038332 A1 | 2/2011 | Liu et al. | |
| 2011/0096796 A1 | 4/2011 | Zhang et al. | |
| 2011/0096797 A1 | 4/2011 | Zhang et al. | |
| 2011/0110339 A1* | 5/2011 | Jeong | H04W 72/042 370/335 |
| 2011/0128929 A1 | 6/2011 | Liu et al. | |
| 2011/0128947 A1 | 6/2011 | Liu et al. | |
| 2011/0194475 A1 | 8/2011 | Kim et al. | |
| 2011/0310827 A1 | 12/2011 | Srinivasa et al. | |
| 2012/0300724 A1 | 11/2012 | Liu et al. | |
| 2012/0315938 A1 | 12/2012 | Van Nee et al. | |
| 2013/0229996 A1 | 9/2013 | Wang et al. | |
| 2013/0259017 A1 | 10/2013 | Zhang et al. | |
| 2013/0286959 A1* | 10/2013 | Lou | H04W 72/04 370/329 |
| 2013/0308524 A1 | 11/2013 | Tavildar et al. | |
| 2014/0226739 A1 | 8/2014 | Onggosanusi et al. | |
| 2015/0063255 A1 | 3/2015 | Tandra et al. | |
| 2015/0117227 A1 | 4/2015 | Zhang et al. | |
| 2015/0131517 A1 | 5/2015 | Chu et al. | |
| 2015/0146653 A1 | 5/2015 | Zhang et al. | |
| 2015/0146657 A1 | 5/2015 | Tsai et al. | |
| 2015/0146807 A1 | 5/2015 | Zhang et al. | |
| 2016/0204912 A1 | 7/2016 | Sun et al. | |
| 2016/0227572 A1 | 8/2016 | Li et al. | |
| 2016/0285600 A1 | 9/2016 | Sun et al. | |

OTHER PUBLICATIONS

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access

(56) References Cited

OTHER PUBLICATIONS

Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).
IEEE P802.11n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).
IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).
Cariou et al., "Multi-channel Transmissions," Doc. No. IEEE 802.11-09/1022r0, *The Institute of Electrical and Electronics Engineers, Inc.*, pp. 1-13 (Sep. 2009).
Chen, "Home Network Basis: Transmission Environments and Wired/Wireless Protocols," Prentice Hall, pp. 1-26 (Jul. 2003).
Hiertz et al., "The IEEE 802.11 Universe," *IEEE Communications Magazine*, pp. 62-70, (Jan. 2010).
Kwon et al., "SIG Field Design Principle for 11ax," Institute for Electrical and Electronics Engineers, draft, 802.11-15/0344r2, 18 pages (Mar. 9, 2015).
Liu et al., "VHT BSS Channel Selection," *Institute of Electrical and Electronics Engineers, Inc.*, doc. No. IEEE 802.11-11/1433r0, pp. 1-10 (Nov. 2011).
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Noh et al., "Channel Selection and Management for 11ac," Doc. No. IEEE 802.11-10/0593r1, *The Institute of Electrical and Electronics Engineers, Inc.*, pp. 1-21 (May 20, 2010).
Park, "IEEE 802.11ac: Dynamic Bandwidth Channel Access," 2011 IEEE Int'l Conf. on Communications (ICC), pp. 1-5 (Jun. 2011).
Pedersen et al., "Carrier Aggregation for LTE-Advanced: Functionality and Performance Aspects," IEEE Communications Magazine, vol. 49, No. 6, pp. 89-95, (Jun. 1, 2011).
Perahia et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).
Redieteab et al., "Cross-Layer Multichannel Aggregation for Future WLAN Systems," 2010 IEEE Int'l Conf. on Communication Systems (ICCS), pp. 740-756 (Nov. 2010).
Shahrnaz et al., "OFDMA Numerology and Structure," IEEE 802.11-15/0330r1 (Mar. 9, 2015—38 pages.
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
van Nee et al., "The 802.11n MIMO-OFDM Standard for Wireless LAN and Beyond," Wireless Personal Communications, vol. 37, pp. 445-453 (Jun. 2006).
Wannstrom, "Carrier Aggregation explained," pp. 1-6 (May 2012).
Yuan et al., "Carrier Aggregation for LTE-Advanced Mobile Communication Systems," *IEEE Communications Magazine*, pp. 88-93 (Feb. 2010).
U.S. Appl. No. 12/730,651, Zhang, et al, "OFDMA with Block Tone Assignment for WLAN," filed Mar. 24, 2010.

(56) References Cited

OTHER PUBLICATIONS

U.S. Appl. No. 14/707,898, Sun et al., "Tone Block Allocation for Orthogonal Division Multiple Access Data Unit," filed May 8, 2015.
International Search Report and Written Opinion for International Application No. PCT/US2016/035827, dated Nov. 2, 2016 (14 pages).
International Preliminary Report on Patentability in International Patent Application No. PCT/US2016/035827, dated Dec. 14, 2017 (9 pages).
Office Action in U.S. Appl. No. 15/173,152, dated Apr. 5, 2018 (21 pages).
Notice of Allowance in U.S. Appl. No. 15/173,152, dated Aug. 10, 2018 (6 pages).

\* cited by examiner

TONE BLOCK ALLOCATION FOR ORTHOGONAL FREQUENCY DIVISION MULTIPLE ACCESS DATA UNIT

CROSS-REFERENCES TO RELATED APPLICATIONS

This application is a continuation of U.S. patent application Ser. No. 14/707,898, entitled "Tone Block Allocation for Orthogonal Frequency Division Multiple Access Data Unit," filed on May 8, 2015, which claims the benefit of the following provisional applications: U.S. Provisional Patent Application No. 61/990,925, entitled "OFDMA Contiguous Resource Allocation Signaling for WiFi," filed on May 9, 2014, U.S. Provisional Patent Application No. 62/030,516, entitled "OFDMA Contiguous Resource Allocation Signaling for WiFi," filed on Jul. 29, 2014, U.S. Provisional Patent Application No. 62/113,744, entitled "OFDMA Contiguous Resource Allocation Signaling for WiFi," filed on Feb. 9, 2015, and U.S. Provisional Patent Application No. 62/151,341, entitled "OFDMA Contiguous Resource Allocation Signaling for WiFi," filed on Apr. 22, 2015. The disclosures of all of the applications referenced above are incorporated herein by reference in their entireties.

FIELD OF THE DISCLOSURE

The present disclosure relates generally to communication networks and, more particularly, to wireless local area networks that utilize orthogonal frequency division multiple access.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes selecting a number of devices in a group of multiple devices to which a first orthogonal frequency division multiple access (OFDMA) data unit is to be transmitted. The method includes selecting a block allocation that indicates respective integer numbers of different tone blocks of a wireless local area network (WLAN) communication channel to be assigned to each device in the group of multiple devices. The method also includes encoding a first field to indicate both the selected number of devices in the group and the selected block allocation. The method includes encoding one or more second fields to indicate a respective device identifier for each device in the group of multiple devices. The method also includes transmitting the first field and the one or more second fields to each device in the group of multiple devices.

In another embodiment, an apparatus includes a network interface device having one or more integrated circuits. The one or more integrated circuits are configured to select a number of devices in a group of multiple devices to which a first orthogonal frequency division multiple access (OFDMA) data unit is to be transmitted. The one or more integrated circuits are configured to select a block allocation that indicates respective integer numbers of different tone blocks of a WLAN communication channel to be assigned to each device in the group of multiple devices. The one or more integrated circuits are configured to encode a first field to indicate both the selected number of devices in the group and the selected block allocation. The one or more integrated circuits are configured to encode one or more second fields to indicate a respective device identifier for each device in the group of multiple devices. The one or more integrated circuits are configured to cause a communication device having the network interface device to transmit the first field and the one or more second fields to each device in the group of multiple devices.

In an embodiment, a method includes selecting, for a first group of devices having a first group size of a plurality of potential group sizes, a set of block allocations from a codebook. The codebook has respective sets of block allocations corresponding to each of the plurality of potential group sizes. The selected set of block allocations is selected to correspond to the first group size. The method also includes selecting a block allocation for the first group of devices from the selected set of block allocations. The selected block allocation indicates a respective set of orthogonal frequency division multiplexing (OFDM) tone blocks to be assigned to each device of the first group of devices. Each set of OFDM tone blocks indicates a respective integer number of different OFDM tone blocks of a wireless local area network (WLAN) communication channel. The method includes assigning, to each device of the first group of devices, the corresponding integer number of different OFDM tone blocks of the selected block allocation, wherein the selected block allocation includes at least i) a first set of OFDM tone blocks assigned to a first device of the first group of devices and ii) a second set of OFDM tone blocks assigned to a second device of the first group of devices. The method also includes generating an orthogonal frequency division multiple access (OFDMA) data unit to be transmitted to the first group of devices via the WLAN communication channel using the assigned set of OFDM tone blocks. The OFDMA data unit includes a preamble portion and a data portion, the preamble portion having an index to the codebook that indicates i) the first group size, and ii) the selected block allocation.

In another embodiment, an apparatus includes a network interface device having one or more integrated circuits. The one or more integrated circuits are configured to select, for a first group of devices having a first group size of a plurality of potential group sizes, a set of block allocations from a codebook. The codebook has respective sets of block allocations corresponding to each of the plurality of potential group sizes. The selected set of block allocations is selected to correspond to the first group size. The one or more integrated circuits are configured to select a block allocation for the first group of devices from the selected set of block allocations. The selected block allocation indicating a respective set of OFDM tone blocks to be assigned to each device of the first group of devices. Each set of OFDM tone blocks indicating a respective integer number of different OFDM tone blocks of a WLAN communication channel. The one or more integrated circuits are configured to assign, to each device of the first group of devices, the corresponding integer number of different OFDM tone blocks of the selected block allocation. The selected block allocation includes at least i) a first OFDM tone block set assigned to a first device of the first group of devices and ii) a second OFDM tone block set assigned to a second device of the first group of devices. The one or more integrated circuits are configured to generate an OFDMA data unit to be transmitted to the first group of devices via the WLAN communication channel using the assigned OFDM tone block sets. The OFDMA data unit includes a preamble portion and a data portion, the preamble portion having an index to the codebook that indicates i) the first group size, and ii) the selected block allocation.

In an embodiment, a method for decoding a data portion includes receiving an OFDMA data unit via a WLAN communication channel. The method further includes decoding a non-legacy signal field of the OFDMA data unit to determine a codebook index. The method further includes determining a number of devices in a group of devices associated with the OFDMA data unit based on the codebook index. The method further includes determining a block allocation based on the codebook index. The block allocation indicating respective sets of OFDM tone blocks for the WLAN communication channel that are assigned to each device of the group of devices. The method further includes determining an assigned set of OFDM tone blocks based on the block allocation. The method further includes decoding a data portion of the OFDMA data unit using the assigned set of OFDM tone blocks.

In yet another embodiment, an apparatus comprises a network interface device having one or more integrated circuits. The one or more integrated circuits are configured to: receive an OFDMA data unit via a wireless local area network (WLAN) communication channel, decode a non-legacy signal field of the OFDMA data unit to determine a codebook index, determine a number of devices in a group of devices associated with the OFDMA data unit based on the codebook index, determine a block allocation based on the codebook index, the block allocation indicating respective sets of OFDM tone blocks for the WLAN communication channel that are assigned to each device of the group of devices, determine an assigned set of OFDM tone blocks based on the block allocation, and decode a data portion of the OFDMA data unit using the assigned set of OFDM tone blocks.

DETAILED DESCRIPTION

Figure 1:
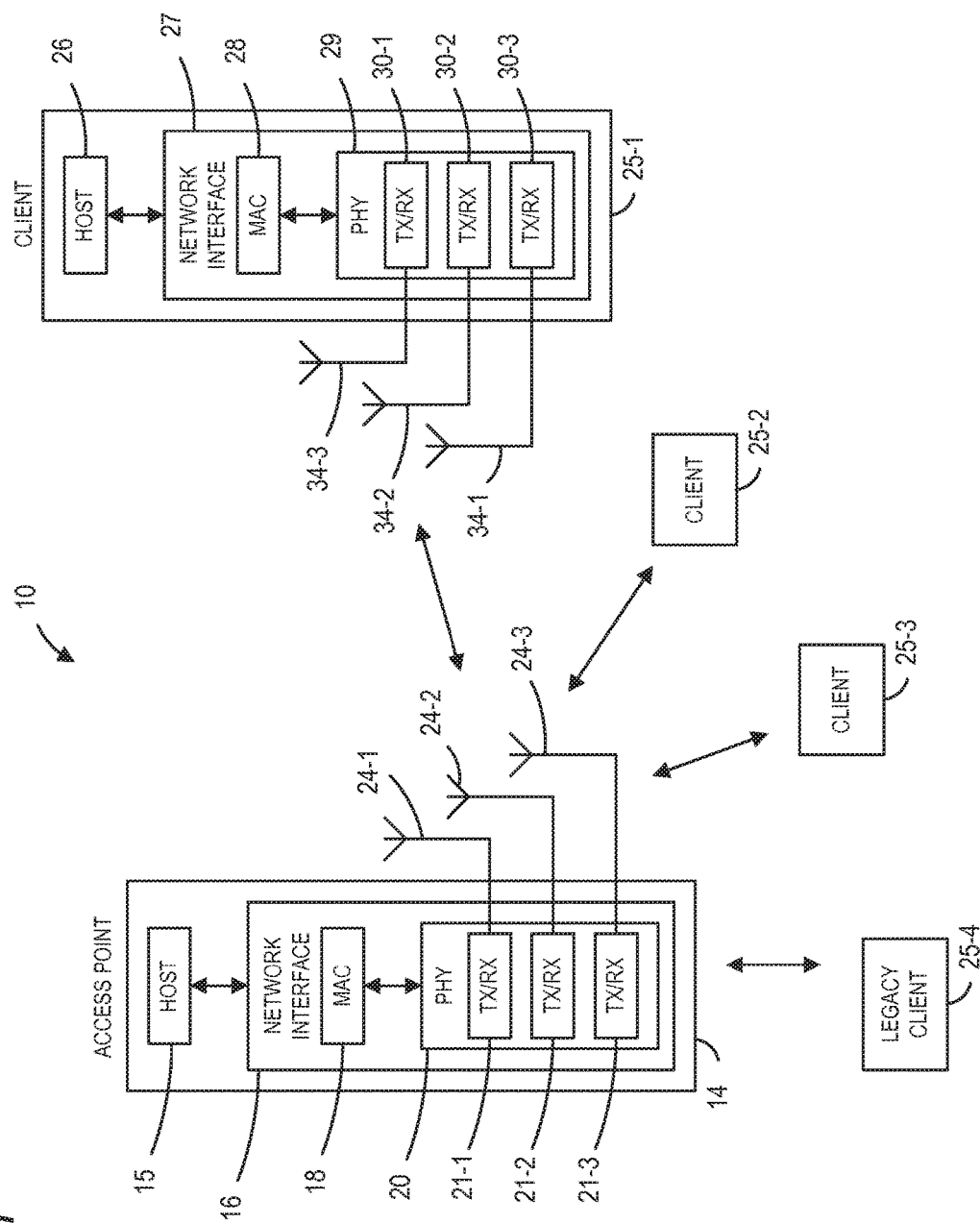
FIG. 1 is a block diagram of an example wireless local area network (WLAN), according to an embodiment.

In embodiments described below, a wireless network device such as an access point (AP) of a wireless local area network (WLAN) transmits data streams to a plurality of client stations. The AP is configured to operate with client stations according to at least a first communication protocol. The first communication protocol is sometimes referred to herein as "high efficiency Wi-Fi," "HEW" communication protocol, or 802.11ax communication protocol. In some embodiments described below, one or more client stations transmit respective data streams to an AP.

According to an embodiment, orthogonal frequency division multiplex (OFDM) symbols transmitted by the AP are generated according to a multiple access mode that partitions a WLAN communication channel into OFDM tone blocks for simultaneous communication with multiple client stations. Simultaneous transmission with the client stations provides a reduction in overhead due to non-user data within a data unit, such as training fields and signal fields, in some embodiments. In an embodiment, the HEW communication protocol defines a regular mode and multiple access mode. The regular mode is generally used for a data unit transmitted to a single client station, while the multiple access mode is generally used for data units transmitted to multiple client stations, in an embodiment. In an embodiment, the multiple access mode is configured to use a codebook for dynamic allocation of OFDM tone blocks to groups of multiple devices where the groups have varying numbers of devices.

In an embodiment, a method for transmitting a first field and one or more second fields includes selecting a number of devices in a group of multiple devices to which a first OFDMA data unit is to be transmitted. The method includes selecting a block allocation that indicates respective integer numbers of different tone blocks of a WLAN communication channel to be assigned to each device in the group of multiple devices. The method includes encoding a first field to indicate both the selected number of devices in the group and the selected block allocation. The method includes encoding one or more second fields to indicate a respective device identifier for each device in the group of multiple devices. The method includes transmitting the first field and the one or more second fields to each device in the group of multiple devices.

In another embodiment, an apparatus includes a network interface device having one or more integrated circuits. The one or more integrated circuits are configured to select a number of devices in a group of multiple devices to which a first orthogonal frequency division multiple access (OFDMA) data unit is to be transmitted. The one or more integrated circuits are configured to select a block allocation that indicates respective integer numbers of different tone blocks of a WLAN communication channel to be assigned to each device in the group of multiple devices. The one or more integrated circuits are configured to encode a first field to indicate both the selected number of devices in the group and the selected block allocation. The one or more integrated circuits are configured to encode one or more second fields to indicate a respective device identifier for each device in the group of multiple devices. The one or more integrated circuits are configured to cause a communication device having the network interface device to transmit the first field and the one or more second fields to each device in the group of multiple devices.

In an embodiment, a method for generating an OFDMA data unit includes selecting, for a first group of devices having a first group size of a plurality of potential group sizes, a set of block allocations from a codebook. The codebook has respective sets of block allocations corresponding to each of the plurality of potential group sizes. The selected set of block allocations is selected to correspond to the first group size. The method includes selecting a block allocation for the first group of devices from the selected set of block allocations. The selected block allocation indicating a respective set of OFDM tone blocks to be assigned to each device of the first group of devices. Each set of OFDM tone blocks indicating a respective integer number of different OFDM tone blocks of a WLAN communication channel. The method includes assigning, to each device of the first group of devices, the corresponding integer number of different OFDM tone blocks of the selected block allocation. The selected block allocation includes at least i) a first set of OFDM tone blocks assigned to a first device of the first group of devices and ii) a second set of OFDM tone blocks assigned to a second device of the first group of devices. The method includes generating the OFDMA data unit to be transmitted to the first group of devices via the WLAN communication channel using the assigned set of OFDM tone blocks. The OFDMA data unit includes a preamble portion and a data portion. The preamble portion having an index to the codebook that indicates i) the first group size, and ii) the selected block allocation.

In another embodiment, an apparatus includes a network interface device having one or more integrated circuits. The one or more integrated circuits are configured to select, for a first group of devices having a first group size of a plurality of potential group sizes, a set of block allocations from a codebook. The codebook has respective sets of block allocations corresponding to each of the plurality of potential group sizes. The selected set of block allocations is selected to correspond to the first group size. The one or more integrated circuits are configured to select a block allocation for the first group of devices from the selected set of block allocations. The selected block allocation indicating a respective set of OFDM tone blocks to be assigned to each device of the first group of devices. Each set of OFDM tone blocks indicating a respective integer number of different OFDM tone blocks of a WLAN communication channel. The one or more integrated circuits are configured to assign, to each device of the first group of devices, the corresponding integer number of different OFDM tone blocks of the selected block allocation. The selected block allocation includes at least i) a first OFDM tone block set assigned to a first device of the first group of devices and ii) a second OFDM tone block set assigned to a second device of the first group of devices. The one or more integrated circuits are configured to generate an OFDMA data unit to be transmitted to the first group of devices via the WLAN communication channel using the assigned OFDM tone block sets. The OFDMA data unit includes a preamble portion and a data portion, the preamble portion having an index to the codebook that indicates i) the first group size, and ii) the selected block allocation.

In another embodiment, a method for decoding a data portion includes receiving an OFDMA data unit via a WLAN communication channel. The method further includes decoding a non-legacy signal field of the OFDMA data unit to determine a codebook index. The method further includes determining a number of devices in a group of devices associated with the OFDMA data unit based on the codebook index. The method further includes determining a block allocation based on the codebook index. The block allocation indicating respective sets of OFDM tone blocks for the WLAN communication channel that are assigned to each device of the group of devices. The method further includes determining an assigned set of OFDM tone blocks based on the block allocation. The method further includes decoding a data portion of the OFDMA data unit using the assigned set of OFDM tone blocks.

In at least some embodiments, data units formatted such as described above are useful, for example, with an AP that is configured to operate with differently sized groups of client stations at various times. In an embodiment, for example, an AP supports a large number of client stations in a group simultaneously with efficient signaling of which tone block sets have been assigned to each device of the group. In some embodiments, the assigned set of OFDM tone blocks are contiguous, which allows for both i) a selected size of the group of multiple devices and ii) a selected block allocation to be encoded together as a single index to a codebook.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., HEW communication protocol), including at least a first mode and a second mode of the first communication protocol. In some embodiments, the first mode corresponds to a multiple access code that partitions a wider communication channel into narrower sub-bands or OFDM sub-channel blocks, and different data streams are transmitted in respective OFDM sub-channel blocks to respective client stations. OFDM sub-channel blocks are sometimes referred to herein as "OFDM tone blocks" (e.g., a block of adjacent tones or sub-carriers); however, in at least some embodiments, an OFDM tone block includes only a single sub-carrier. The multiple access mode is configured to provide an OFDMA data unit that includes at least a portion of separate data streams to respective client stations. In another embodiment, the MAC processing unit 18 and the PHY processing unit 20 are also configured to operate according to a second communication protocol (e.g., IEEE 802.11ac Standard). In yet another embodiment, the MAC processing unit 18 and the PHY processing unit 20 are additionally configured to operate according to the second communication protocol, a third communication protocol, and/or a fourth communication protocol (e.g., the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is configured to process received data units conforming to the first communication protocol and having formats described hereinafter and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

Figure 2:
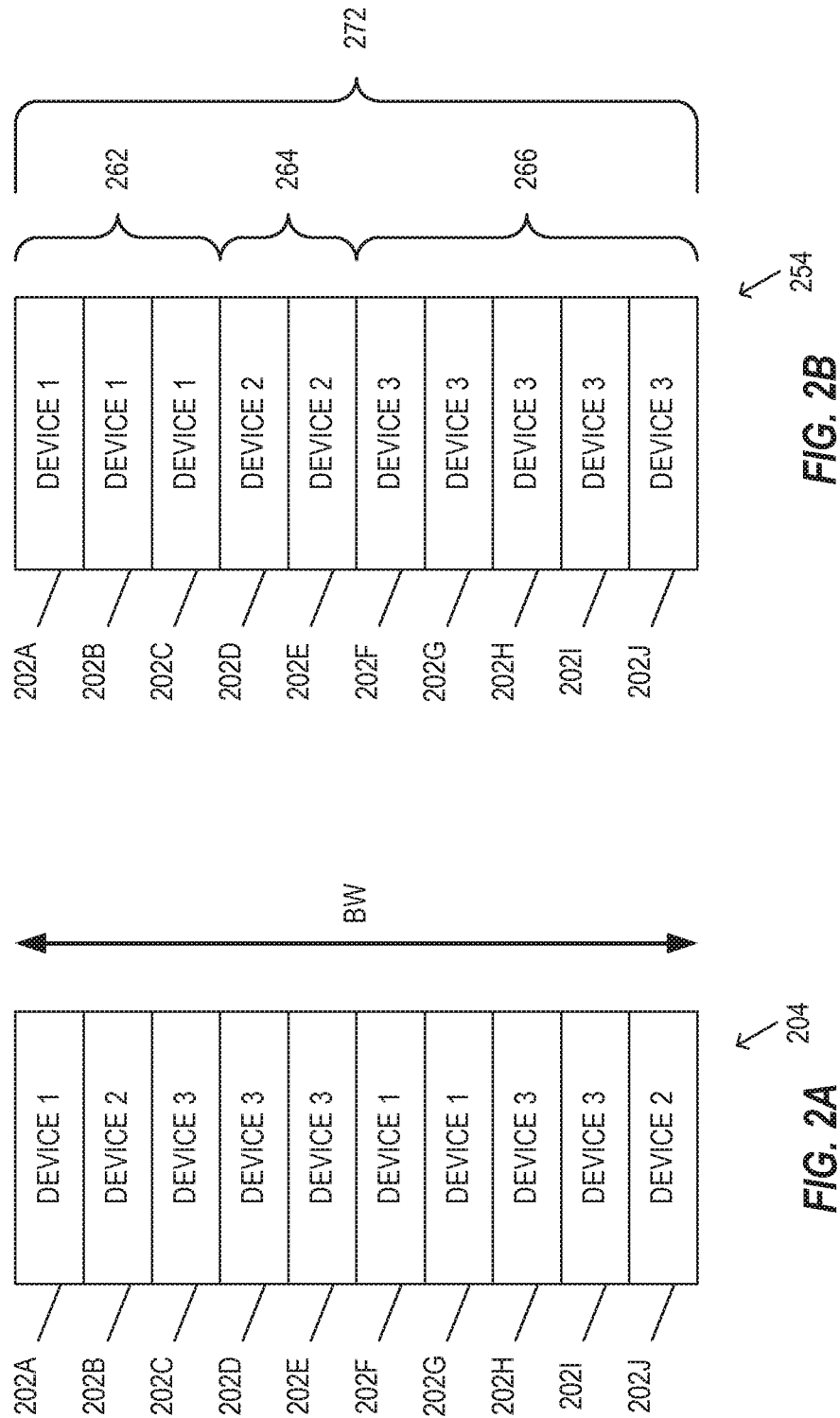
FIG. 2A is a diagram illustrating an example of orthogonal frequency division multiplexing (OFDM) sub-channel blocks of an orthogonal frequency division multiple access (OFDMA) data unit for a WLAN communication channel, according to an embodiment.
FIG. 2B is a diagram illustrating another example of OFDM sub-channel blocks of an OFDMA data unit, according to an embodiment.

FIG. 2A is a diagram illustrating an example of OFDM tone blocks 202 of an OFDMA data unit 204 for a WLAN communication channel, according to an embodiment. In an embodiment, for example, the AP 14 selects a block allocation for a group of multiple devices (DEVICE 1, DEVICE 2, and DEVICE 3) and transmits the OFDMA data unit 204 based on the block allocation. While only three devices are shown for clarity, in other embodiments, the AP 14 selects two, four, five, or another suitable number of devices for the group of multiple devices.

In the embodiment shown in FIG. 2A, the OFDMA data unit 204 occupies or "spans" a bandwidth BW of the WLAN communication channel which is sub-divided into ten OFDM tone blocks 202. In other embodiments or scenarios, a data unit similar to the data unit 204 occupies a different bandwidth, such as a 20 MHz, a 40 MHz, a 160 MHz bandwidth, or other suitable bandwidth. In some embodiments, the data unit 204 spans an entire bandwidth of the WLAN communication channel. In other embodiments, the data unit 204 spans a contiguous portion of the entire bandwidth of the WLAN communication channel.

In the embodiment shown in FIG. 2A, the OFDMA data unit 204 has a generally non-contiguous block allocation of the OFDM tone blocks to the three devices. In some embodiments, each OFDM tone block is separately signaled for each corresponding device; however, in some scenarios, this approach is less efficient for signaling overhead because each OFDM tone block requires a corresponding device identifier to indicate which device of the group of multiple devices should use the OFDM tone block. In the embodiment shown in FIG. 2A, for example, the device identifier for DEVICE 1 must be repeated for each of OFDM tone blocks 202A, 202F, and 202G, the device identifier for DEVICE 2 must be repeated for each of OFDM tone blocks 202B, and 202J, and the device identifier for DEVICE 3 must be repeated for each of OFDM tone blocks 202C, 202D, 202E, 202H, and 202I.

FIG. 2B is a diagram illustrating another example of OFDM tone blocks 202 of an OFDMA data unit 254, according to an embodiment. In an embodiment, for example, the AP 14 selects a block allocation for the group of multiple devices (DEVICE 1, DEVICE 2, and DEVICE 3) and transmits the OFDMA data unit 254 based on the block allocation, as described above with respect to OFDMA data unit 204. However, in the embodiment shown in FIG. 2B, the AP 14 selects a generally contiguous block allocation 272 of the OFDM tone blocks 202. The block allocation 272 includes respective sets of OFDM tone blocks for each device in the group of multiple devices, for example, set 262, set 264, and set 266 correspond to DEVICE 1, DEVICE 2, and DEVICE 3, respectively. In some embodiments, the contiguous block allocation 272 is represented by respective integer numbers of different tone blocks corresponding to the devices, for example, integer numbers 3, 2, and 5 in the example shown in FIG. 2B. In an embodiment, an order of the integer numbers of different tone blocks corresponds to an allocation order for the corresponding devices in the group.

Figure 3:
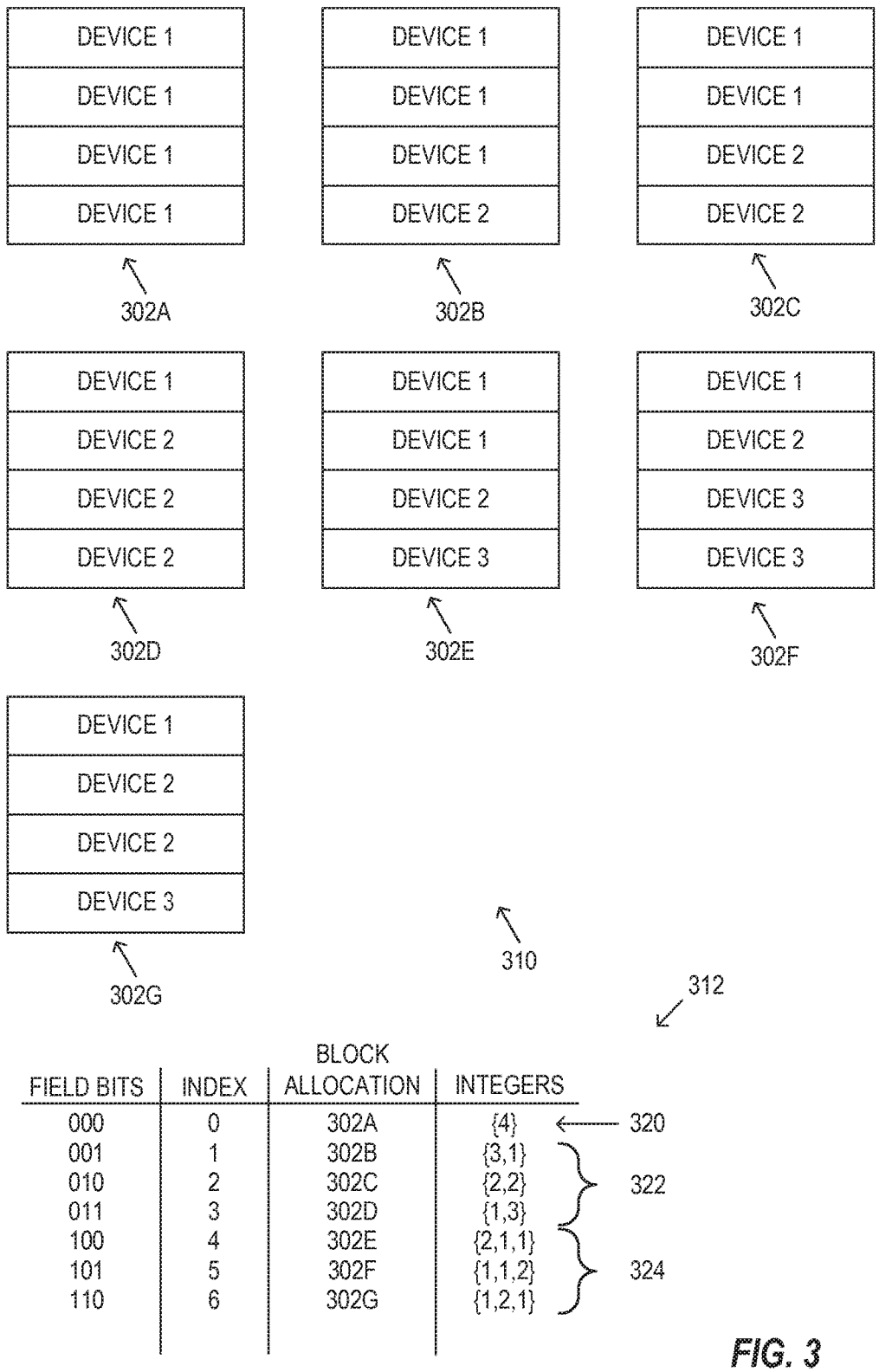
FIG. 3 is a diagram illustrating an example codebook for allocation of OFDM sub-channel blocks, according to an embodiment.

FIG. 3 is a diagram illustrating an example codebook 310 for allocation of OFDM tone blocks, according to an embodiment. In various embodiments and/or scenarios, the codebook 310 includes a plurality of block allocations 302. In an embodiment, each of the block allocations 302 corresponds to an assignment of a predetermined maximum number of OFDM tone blocks of the WLAN communication channel to one or more devices, sometimes referred to herein as a maximum number of OFDM tone blocks N or a maximum number N. In some embodiments, the codebook 310 is configured with a suitable number of block allocations for assigning the predetermined maximum number of OFDM tone blocks to a predetermined maximum number of devices, sometimes referred to herein as a maximum number of devices K or a maximum number K. In some embodiments, the maximum number of devices K is less than or equal to the maximum number of OFDM tone blocks N.

In the embodiment shown in FIG. 3, the maximum number of OFDM tone blocks N is four and the maximum number of devices K is three. In this embodiment, four OFDM tone blocks span the entire WLAN communication channel and each block allocation 302 assigns all four OFDM tone blocks to one, two or three devices. In other embodiments, the codebook 310 is configured to use other suitable values for N and K. In some embodiments, the codebook 310 is reconfigurable, for example, by incrementing or decrementing the number of block allocations 302 within the codebook 310. In an embodiment, for example, the codebook 310 is initially generated with predetermined numbers N=10 and K=3 and updated with higher values of K (e.g., 4, 5, etc.) as additional devices request access to the WLAN communication channel, as data to be transmitted to other devices becomes available, or at other suitable times. In some embodiments, reconfiguration of the codebook 310 allows for reduced memory storage (i.e., storage of the codebook 310), processing overhead, and/or signaling overhead associated with use of the codebook 310 until additional entries of the codebook 310 are determined to be needed.

In various embodiments, each block allocation 302 of the codebook 310 corresponds to a number of devices in a group of multiple devices and also indicates respective integer numbers of different tone blocks of a wireless local area network (WLAN) communication channel to be assigned to each device in the group of multiple devices. The integer numbers of different tone blocks indicate respective sets of OFDM tone blocks for each device in the group, in various embodiments.

The AP 14 selects a number of devices in a group of multiple devices to which an OFDMA data unit is to be transmitted, in various embodiments. The selected number of devices is sometimes referred to herein as a selected number of devices n or a selected number n. In some embodiments, the AP 14 selects the number of devices n from a plurality of potential numbers of devices that are supported by the codebook 310. In some embodiments, the plurality of potential numbers of devices includes each positive integer from one to the maximum number K. For example, for a maximum number K=4, the plurality of potential numbers of devices includes numbers 1, 2, 3, and 4. In other embodiments, one or more numbers are omitted, providing a numerically ordered set of integers having at least two non-sequential integer values, for example, a plurality of potential numbers that includes 1, 2, 4, and 6 for K=6 but omits numbers 3 and 5. In some embodiments, a number is omitted in order to reduce memory storage, processing overhead, and/or signaling overhead associated with use of the codebook 310.

In some embodiments, the codebook 310 includes block allocations organized as sets of block allocations, for example, sets 320, 322, and 324. In an embodiment, each number of devices n supported by the codebook 310 corresponds to a set of block allocations. In the embodiment of FIG. 3, as one example: the set 320 includes block allocation 302A and corresponds to a selected number n=1; the set 322 includes block allocations 302B, 302C, and 302D and corresponds to a selected number n=2; and the set 324 includes block allocations 302E, 302F, and 302G and corresponds to a selected number n=3. In some embodiments, each set of block allocations includes every combination of allocating N OFDM tone blocks to a corresponding number of users. For example, for a maximum number K=4, the plurality of potential numbers of devices includes numbers 1, 2, 3, and 4. In other embodiments, one or more numbers are skipped, providing a numerically ordered set of integers having at least two non-sequential integer values, for example, a plurality of potential numbers that includes 1, 2, 4, and 6 for K=6.

In some embodiments, the codebook 310 includes a lookup table 312 that corresponds to an ordered list of the block allocations of the sets of block allocations for the plurality of potential numbers of devices. In various embodiments and/or scenarios, the AP 14 selects a block allocation from the codebook 312, for example, from the set of block allocations that corresponds to the selected number of device n, and determines an index to the codebook 312 that indicates the selected block allocation.

In an embodiment, the AP 14 encodes a first field to indicate both the selected number of devices in the group and the selected block allocation. For example, the AP 14 encodes the index to the lookup table 312 as a field in an OFDMA data unit, a management frame, or other suitable frame. In the embodiment shown in FIG. 3, the first field is encoded as a binary representation of the index. In an embodiment, the AP 14 encodes one or more second fields to indicate a respective device identifier for each device in the group of multiple devices. In various embodiments, the device identifier is a media access control (MAC) address, Internet Protocol address, user identifier, device serial number, or other suitable identifier. In some embodiments and/or scenarios, the AP 14 transmits the first field and the second field to devices of a group of multiple devices as a notification of the assignment of OFDM tone blocks. In various embodiments, the AP 14 and the group of multiple devices use the selected block allocation for an uplink OFDMA data unit, a downlink OFDMA data unit, or both uplink data units and downlink data units.

In various embodiments, the ordered list is selected to increase efficiency in encoding and/or decoding of the selected block allocation. In the embodiment shown in FIG. 3, the lookup table 312 includes an ordered list corresponding to a concatenated list of the block allocations for each of the plurality of potential numbers of devices. In another embodiment, the ordered list corresponds to an estimated frequency of use for at least some block allocations of the codebook. In an embodiment, for example, block allocations which are used with a higher frequency appear with lower values of the index.

In some embodiments, the codebook 312 includes all potential combinations of block assignments for a maximum number N OFDM tone blocks and a maximum number K devices. For example, if only one device is scheduled (e.g., assigned OFDM tone blocks), then that device is assigned {N} OFDM tone blocks. As another example, if two devices are scheduled, the potential block allocations include {N−1, 1}, {N−2, 2} ..., {1, N−1}. As yet another example, if the maximum number K is scheduled, then the potential block allocations include {N−K+1, 1, 1, ..., 1}, ..., {1, 1, 1, ..., N−K+1}. In some scenarios, the selected number of devices n is less than the maximum number K and the j-th potential block assignment is indicated by a set of allocation blocks $A_n(j)=\{a_1 \ldots a_n\}$, where the i-th element indicates the number of OFDM tone blocks assigned to the i-th device of the group of multiple devices having a number of devices n. Using the codebook 312 as an example, the first block allocation of the set of block allocations for n=2 is $A_2(1)=$ {N−1, 1}, which corresponds to the block allocation 302B and the index 1. When n devices are scheduled, the number of all combinations for block assignments is $C(N-1, n-1)$ where $C(n, k)$ is the binomial coefficient function. In some embodiments, $C(n, k)$ is evaluated as:

$$C(n, k) = \frac{n!}{k! \cdot (n-k)!} \quad 0 \le k \le n \quad \text{(Eqn. 1)}$$

In an embodiment, a lookup table (not shown) has a total number W of block allocations equal to:

$$W = C(N-1, 0) + C(N-1, 1) + C(N-1, K-1) \quad \text{(Eqn. 2)}$$

In this embodiment, a first field has a bit length equal to:

$$\text{ceil}\left(\log_2\left(\sum_{j=0}^{K-1} C(N-1, j)\right)\right) \quad \text{(Eqn. 3)}$$

where ceil( ) is a ceiling function. In the embodiment shown in FIG. 3, the bit length of the first field for the codebook 312 is equal to three. In various embodiments, a device that receives the first field decodes the first field to determine which allocation block $A_n(j)$ has been selected by the AP 14. For example, a first field value of "011" corresponds to the index value of 3, which indicates that the selected block allocation is block allocation 302D. The block allocation 302D indicates that there are two scheduled devices: a first scheduled device assigned a set of OFDM tone blocks having one OFDM tone block; and a second scheduled device assigned a set of OFDM tone blocks having three OFDM tone blocks.

Figure 4:
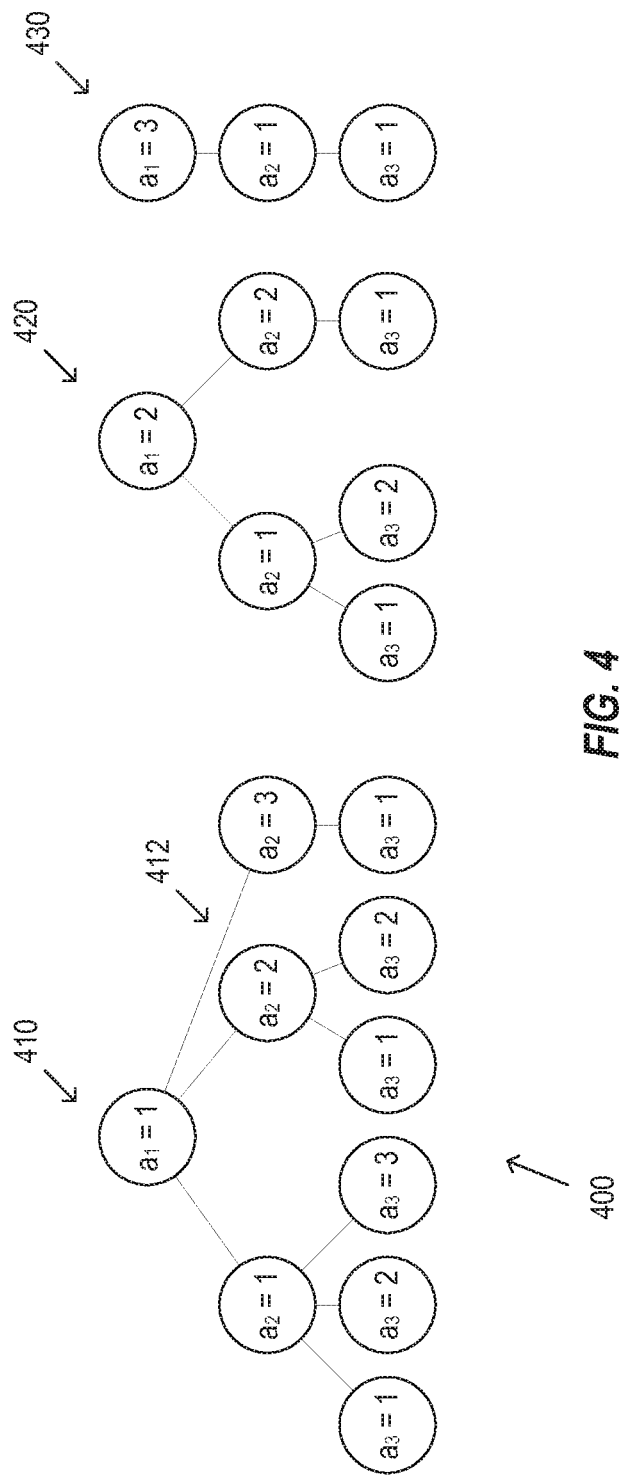
FIG. 4 is a diagram illustrating an example codebook implemented with a tree structure, according to an embodiment.

In various embodiments, a lookup table that includes all potential combinations of block assignments for a codebook having a maximum number of OFDM tone blocks N and a maximum number of devices K is not stored in a memory, but instead the AP 14 determines an index for the codebook using an iterative process based on a tree structure. FIG. 4 is a diagram illustrating an example codebook 400 implemented as a tree structure. The codebook 400 includes block allocations for a maximum number of OFDM tone blocks N=6 and a maximum number of devices K=4. In other embodiments, the codebook 400 corresponds to other suitable values of N and K.

In various embodiments, the AP 14 is configured to use the iterative process to determine an index to the codebook 400. The codebook 400 includes concatenated sets of block allocations $A_n(i)$ for each of the plurality of potential numbers of devices (e.g., 1, 2, 3, ... K) and each block allocation $A_n(i)$ includes respective integer numbers of different tone blocks $\{a_1, \ldots a_n\}$:

$$A_n(i) = \{a_1, \ldots a_n\} \text{ for } i=1 \ldots C(N-1, n-1), n=1 \ldots K \quad \text{(Eqn. 4)}$$

As an example, where n=4 devices, each block allocation $A_n(i)$ in the corresponding set of block allocations has four integers $\{a_1, a_2, a_3, \text{ and } a_4\}$. In some embodiments, the codebook 400 includes sub-groups within each set of block allocations for block allocations having a same value $a_1$, for example, sub-groups have respective values of $a_1$ from 1, 2, ... N−n+1. For $a_1$=t, there are $C(N-t-1, n-2)$ different block assignments within the set of block allocations $A_n(i)$. The AP 14 determines further sub-groups iteratively for k steps, where k is an index from 2 to n−1 and there are $C(N-a_1-a_2-\ldots-a_k-1, n-k-1)$ block assignments in the k-th group. In an embodiment, when k=n−1, each subgroup includes only one block assignment and the AP 14 ends the iteration process.

Referring to FIG. 4, a set of block allocations $A_n(i)$ where n=4 and N=6 includes a first sub-group 410 where $a_1$=1, a second sub-group 420 where $a_1$=2, and a third sub-group 430 where $a_1$=3. The sub-group 410 includes block allocations {1, 1, 1, 3}, {1, 1, 2, 2}, {1, 1, 3, 1}, {1, 2, 1, 2}, {1, 2, 2, 1}, and {1, 3, 1, 1}. The sub-group 420 includes block allocations {2, 1, 1, 2}, {2, 1, 2, 1}, and {2, 2, 1, 1}. The sub-group 430 includes block allocation {3, 1, 1, 1}. As an example of a further sub-group, the sub-group 410 includes sub-group 412 which includes block allocations where $a_1$=1 and $a_2$=2 (i.e., block allocations {1, 2, 1, 2} and {1, 2, 2, 1}).

In an embodiment, the AP 14 determines the index of a selected allocation block in the codebook 400 by determining a number of block allocations which are located to the left of the selected allocation block in the tree. For example, for a selected number of devices n, the AP 14 determines a codebook index $I(A_n(m))$ as:

$$I(A_n(m)) = \sum_{i=1}^{n-1} C(N-1, i-1) + m \quad \text{(Eqn. 5)}$$

where $$\sum_{i=1}^{n-1} C(N-1, i-1)$$

indicates a total number of block allocations for the sets of block allocations that correspond to smaller numbers of devices in the group and m is an index into the set of block allocations for the selected number of devices.

To encode the index m, as an example for a selected block allocation $A_n(m)=\{t_1, \ldots t_n\}$, $A_n(m)$ is in the $a_k$-th subgroup at the k-th step for k=1 ... n−1. The number of entries in the subgroup for $a_1$=1, $a_1$=2, ... $a_1$=$t_1$−1 is $m^{(1)}$, determined as:

$$m^{(1)} = \sum_{t=1}^{t_1-1} C(N-t-1, n-2) \qquad \text{(Eqn. 6)}$$

Iteratively, at the k-th step, the number of block allocations in the first through $(a_{k-1}-1)$-th subgroup is $$m^{(k)} = \sum_{t=1}^{t_k-1} C(N - (t_1 + t_2 + \ldots t_{k-1}) - t - 1 \cdot n - k - 1) \qquad \text{(Eqn. 7)}$$

Therefore:

$$m = \qquad \text{(Eqn. 8)}$$

$$\sum_{k=1}^{n} m^{(k)} = \sum_{k=1}^{n} \sum_{t=1}^{t_k-1} C(N - (t_1 + t_2 + \ldots t_{k-1}) - t - 1 \cdot n - k - 1)$$

In an embodiment, the AP 14 encodes the codebook index I as:

$$I = \sum_{k=1}^{n-1} C(N-1, k-1) + \sum_{i=1}^{n-1} \sum_{t=1}^{a_i=1} C\left(N - \sum_{j=1}^{i-1} a_j - t, n - i - 1\right) \qquad \text{(Eqn. 9)}$$

In some embodiments, the AP 14 stores a table of binomial coefficients and performs a lookup to evaluate $C( )$ when iteratively determining the codebook index I. In an embodiment, the lookup table stores $C(n, k)$ entries for $n=1 \ldots N-1$, and $k=0 \ldots n$. In another embodiment, the lookup table omits duplicate entries where $C(n, k)=C(n, n-k)$. In this embodiment, a total buffer size for the lookup table is $$\sum_{k=2}^{N}\left[\frac{k}{2}\right] = \begin{cases} \dfrac{N^2}{4} + \dfrac{N}{4} - 1 & \text{for even values of } N \\ \dfrac{N^2}{4} + \dfrac{N}{4} - \dfrac{3}{4} & \text{for odd values of } N \end{cases} \qquad \text{(Eqn. 10)}$$

In an embodiment, for N=16, the table of binomial coefficients stores 71 values, each less than a 16 bit integer, for a total buffer size of 144 Bytes. In another embodiment, for N=32, the table of binomial coefficients stores 271 values, each less than a 32 bit integer, for a total buffer size of 1082 Bytes. In other embodiments, the AP 14 is configured to use other tree-based coding schemes.

In various embodiments and/or scenarios, a client device 25 of the group of multiple devices determines the selected number of devices n and the block allocation $A_n(m)$ based on a received codebook index I. In an embodiment, the client device 25 iteratively compares the codebook index with a size of a set of block allocations where the set of block allocations includes block allocations having a same number of sets of OFDM tone blocks. For example, the client device 25 determines the selected number of devices n as:

$$\sum_{k=1}^{n-2} C(N-1, k-1) \leq I < \sum_{k=1}^{n-1} C(N-1, k-1) \qquad \text{(Eqn. 11)}$$

In some embodiments, the client device 25 iteratively determines the selected number of devices n by iteratively performing, for k=1 to K:

If $I < C(N-1,k-1)$ then $n=k$

If $I \geq C(N-1,k-1)$ then $I = I - C(N-1,k-1)$ and $k=k+1$ \qquad (Eqn. 12)

After determining the codebook index I, the client device 25 determines the selected block assignment $A_n(m) = \{a_1, \ldots a_n\}$, in an embodiment. The client device 25 removes information for the number of scheduled devices to determine the index m into the selected block allocation:

$$m = I - \sum_{k=1}^{n-1} C(N-1, k-1) \qquad \text{(Eqn. 13)}$$

The client device 25 determines the set of OFDM tone blocks assigned to a first scheduled user (i.e., $a_1$) according to:

$$\sum_{t=1}^{a_1-1} C(N-t-1, n-2) \leq m < \sum_{t=1}^{a_1} C(N-t-1, n-2) \qquad \text{(Eqn. 14)}$$

After determining the set of OFDM tone blocks $a_1$, the client device 24 removes $a_1$ by determining $m=m-C(N-a_1-2, n-2)$ and then determines a next set of OFDM tone blocks $a_2$:

$$\sum_{t=1}^{a_2-1} C(N - a_1 - t -, n-3) \leq m < \sum_{t=1}^{a_2} C(N - a_1 - t - 1, n-3) \qquad \text{(Eqn. 15)}$$

Generally, the client device 25, at a k-th step of iterative decoding, removes the sets of OFDM tone blocks for $a_1, \ldots a_{k-1}$ by performing:

$$m = m - \sum_{i=1}^{k-1} C\left(N - \sum_{j=1}^{i} a_j - 2 \cdot n - i - 1\right) \qquad \text{(Eqn. 16)}$$

The client device 25 determines the set of OFDM tone blocks $a_k$ as:

$$\sum_{t=1}^{a_k-1} C\left(N - \sum_{j=1}^{k} a_j - t - 1, n - k - 1\right) \leq \qquad \text{(Eqn. 17)}$$

$$m < \sum_{t=1}^{a_k} C\left(N - \sum_{j=1}^{k} a_j - t - 1, n - k - 1\right)$$

In some embodiments, the equations 13, 14, 15, 16, and 17 are performed using iterative processing or tree-based searches. In an embodiment, the complexity of decoding is a strictly N comparison.

Figure 5:
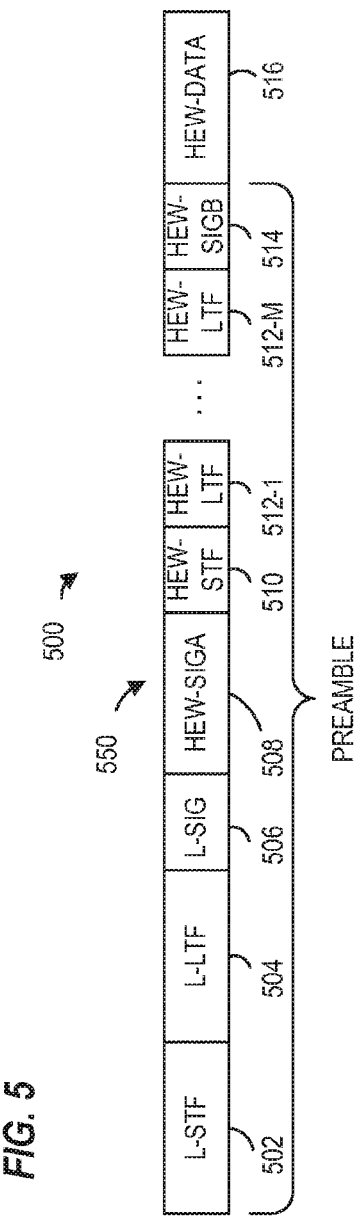
FIG. 5 is a diagram illustrating an example data unit format for an OFDMA data unit, according to an embodiment.

FIG. 5 is a diagram illustrating an example data unit format for an OFDMA data unit 500, according to an embodiment. The AP 14 is configured to transmit the data unit 500 over a communication channel to a plurality of client stations via OFDM modulation, according to an embodiment. The AP 14 partitions the communication channel into sets of OFDM tone blocks and assigns the sets of OFDM tone blocks to a group of client stations as described above, in an embodiment. In some embodiments, the OFDMA data unit 500 conforms to the first communication protocol. In some embodiments, the client stations 25 are also configured to transmit the data unit 500 to the AP 14. The data unit 500 occupies a 20 MHz bandwidth. In other embodiments or scenarios, a data unit similar to the data unit 500 occupies a different bandwidth, such as a 40 MHz, an 80 MHz, or a 160 MHz bandwidth. The data unit 500 includes a preamble having a legacy short training field (L-STF) 502, a legacy long training field (L-LTF) 504, a legacy signal field (L-SIG) 506, a first non-legacy signal field (HEW-SIGA) 508, a non-legacy short training field (HEW-STF) 510, M non-legacy long training fields (HEW-LTFs) 512, where M is an integer, and a second non-legacy signal field (VHT-SIG-B) 514. The data unit 500 also includes a data portion 516.

In some embodiments, the AP 14 sets an OFDMA indicator (OI) 550 in the OFDMA data unit 500 to signal the receiver that the current data unit is a downlink OFDMA data unit. According to an embodiment, the OFDMA indicator 550 includes the first field to indicate both the selected number of devices in the group and the selected block allocation and the one or more second fields, as described above. In another embodiment, the OFDMA indicator 550 includes i) the first field and ii) the one or more second fields to indicate the respective device identifiers for each device in the group of multiple devices, as described above.

In some embodiments, the OFDMA indicator 550 is a single field, within the first non-legacy signal field 508, that includes the first field and the second field. In other embodiments, the first field is included in the non-legacy signal field 508 and the one or more second fields are included in the second non-legacy signal field 514. In an embodiment, the one or more second fields are explicitly included in the second non-legacy signal field 514. In another embodiment, the one or more second fields are implicitly included in the second non-legacy signal field 514. In one such embodiment, for example, instead of being a separate field, the second field is combined with the second non-legacy signal field. In another embodiment, the AP 14 performs an exclusive OR operation with the device identifier of the second field and a respective cyclic redundancy check of the second non-legacy signal field 514. In some embodiments, the cyclic redundancy check of the second non-legacy signal field 514 is included in the data portion 516.

In some embodiments, the OFDMA indicator 550 includes joint coding for the selected number of devices n, the selected block allocation, and the corresponding device identifiers. In an embodiment, the OFDMA indicator 550 also includes one or more PHY parameters. In an embodiment, a codebook (not shown) includes all potential combinations of device identifier and block allocation for each of a plurality of potential numbers of devices. In one such embodiment, the AP 14 is configured to use a hierarchical codebook as described above with respect to FIGS. 3 and 4.

In an embodiment, the OFDMA indicator 550 is included in a management frame. In another embodiment, the OFDMA indicator 550 is included in both OFDMA data units and management frames. For example, in an embodiment, the first field is included in a management frame and the one or more second fields are included in an OFDMA data unit.

In some embodiments, the OFDMA indicator 550 is combined with a modulation and coding scheme (MCS) indicator or other suitable sub-field. In an embodiment, for example, the regular mode corresponds to MCS values which are determined to be valid by a legacy receiver device (e.g., in compliance with IEEE 802.11ac protocol), while the multiple access mode corresponds to an MCS value that is determined to be invalid (or not supported) by the legacy receiver device (e.g., not in compliance with IEEE 802.11ac protocol). In other embodiments, the OFDMA indicator 550 has a plurality of bits that indicate a plurality of regular mode MCS values and a plurality of range extension mode MCS values.

In some embodiments, the OFDMA indicator 550 includes the first field as a group ID sub-field within the HEW-SIGA 508. In an embodiment, the group ID sub-field identifies an OFDMA group (i.e., a plurality of client stations intended to decode the OFDMA data unit 500). In one such embodiment, the group ID sub-field includes a group ID value that indicates any of a multi-user (MU) MIMO data unit, an OFDMA data unit, or a single user data unit. In this embodiment, a separate indication field is not needed to distinguish between OFDMA data units and non-OFDMA data units and thus a receiver can determine which type of data unit by parsing the group ID sub-field. In one embodiment, the group ID sub-field indicates that OFDMA and MU-MIMO are used together within a same data unit.

In an embodiment, the OFDMA indicator 550 is configured to signal the MCS, number of spatial streams, a coding scheme, space time block coding, or other PHY parameters for decoding each corresponding OFDM tone block. In some embodiments, where the number of HEW-LTFs for all users in different OFDM tone blocks are the same (i.e., insertion of HEW-LTFs for padding or corresponding to a number for the largest $N_{sts}$ among client stations), the OFDMA indicator 550 signals both the $N_{sts}$ of the current client station and a maximum $N_{sts}$ among all client stations.

In some embodiments, the OFDMA indicator 550 includes a tone block assignment indication that indicates which OFDM tone blocks have been assigned to a client station. In an embodiment, the tone block assignment indication is a mapping table that maps a user ID to an OFDM tone block ID, as described in U.S. patent application Ser. No. 14/553,974, entitled "Orthogonal Frequency Division Multiple Access for Wireless Local Area Network" and filed on Nov. 25, 2014, the disclosure of which is incorporated herein by reference in its entirety. In some embodiments, the OFDMA indicator 550 is different for subsequent OFDMA data units, which allows the AP to dynamically partition and/or assign OFDM tone blocks to client stations on a per-data unit basis. In other embodiments, the tone block assignment indication is omitted, for example, where the OFDM tone block assignment is fixed for a longer duration (e.g., fixed when an OFDMA group is formed or changed after a predetermined number of data units have been sent).

Figure 6:
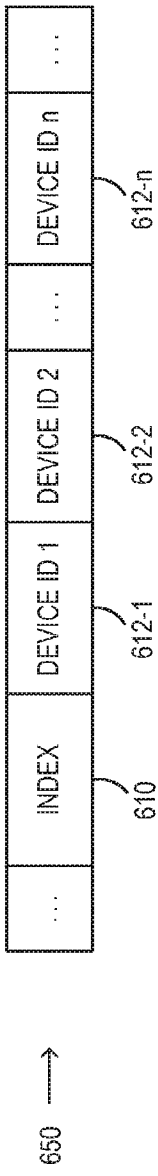
FIG. 6 is a diagram illustrating an example format of a first field and a second field of an OFDMA data unit, according to an embodiment.

FIG. 6 is a diagram illustrating an example format of a first field 610 and a second field 612 of an OFDMA data unit 650, according to an embodiment. In the embodiment shown in FIG. 6, the first field 610 includes a single index to a codebook, for example, as described above with respect to FIGS. 3 and 4. The second field 612 in this embodiment includes a variable number of sub-fields that corresponds to the selected number of devices n. In an embodiment, the sub-fields of the second field 612 have respective device identifiers for each device of the first group of multiple devices in a same order as the sets of OFDM tone blocks of the selected block allocation. In an embodiment, the second non-legacy signal fields 612 are modulated based on the selected block allocation.

Figure 7:
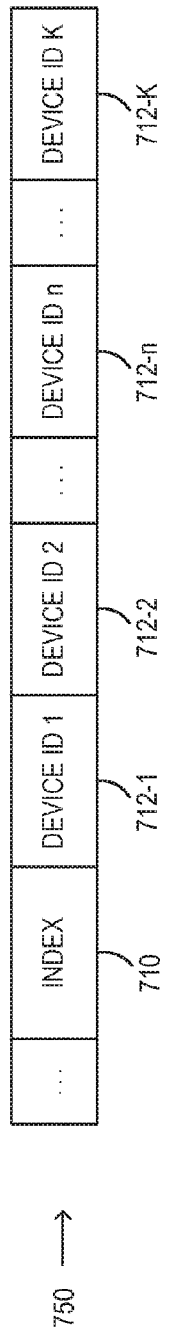
FIG. 7 is a diagram illustrating another example format of a first field and a second field of an OFDMA data unit, according to an embodiment.

FIG. 7 is a diagram illustrating another example format of a first field 710 and a second field 712 of an OFDMA data unit 750, according to an embodiment. In the embodiment shown in FIG. 7, the first field 710 includes a single index to a codebook, for example, as described above with respect to FIGS. 3 and 4. The second field 712 in this embodiment includes a predetermined number of sub-fields that corresponds to the maximum number of devices K. In some scenarios where the selected number of devices n is less than the maximum number of devices K, remaining sub-fields of the second field 712 are empty or contain a null value.

Figure 8:
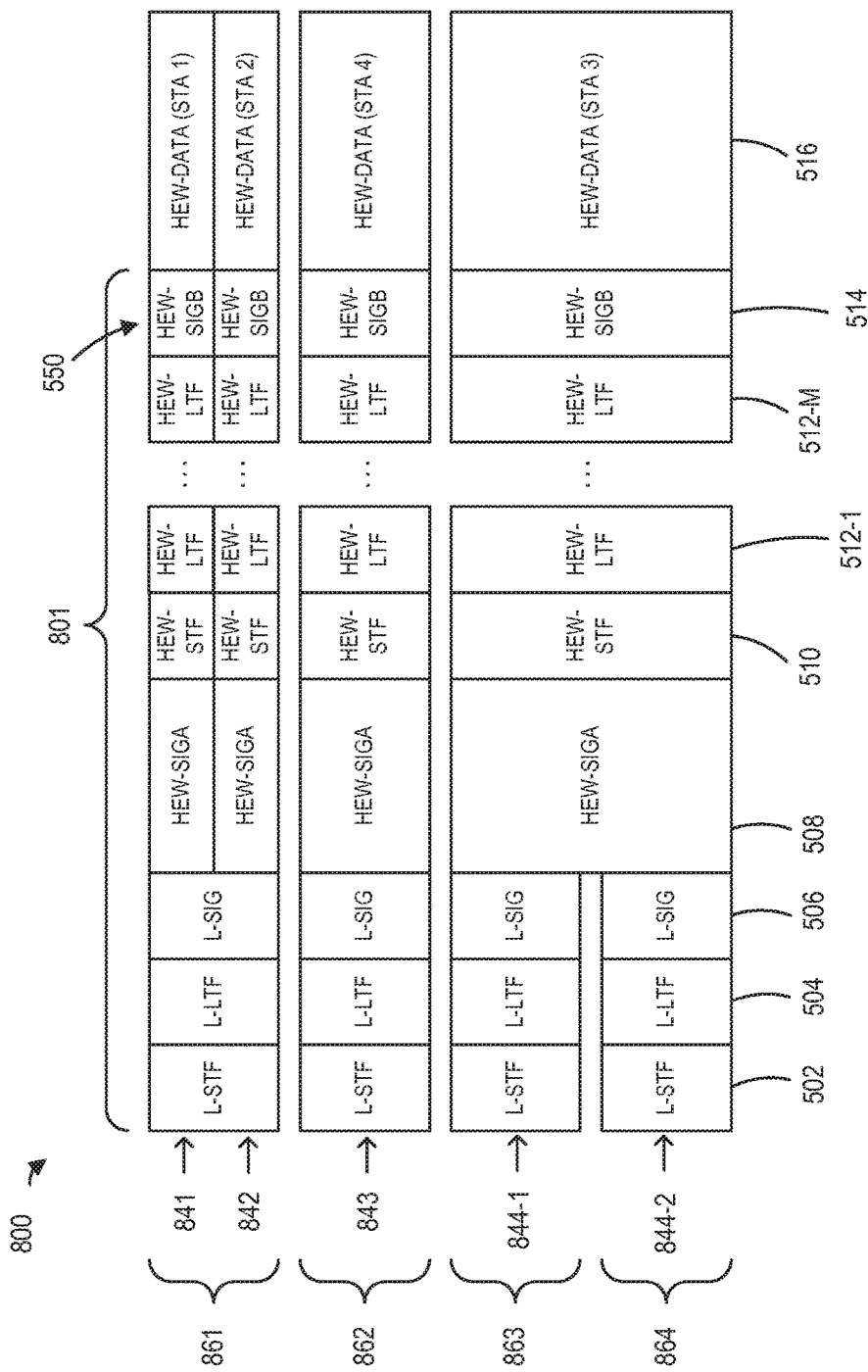
FIG. 8 is a block diagram of an example downlink OFDMA data unit, according to an embodiment.

FIG. 8 is a block diagram of an example downlink OFDMA data unit 800, according to an embodiment. In FIG. 8, an 80 MHz communication channel is partitioned into four contiguous OFDM tone blocks 841, 842, 843, and 844, according to an embodiment. The OFDM tone block 841 and OFDM tone block 842 are adjacent and each have a bandwidth of 10 MHz, thus together the OFDM tone block 841 and OFDM tone block 842 span a bandwidth equal to a smallest channel bandwidth of a legacy WLAN communication protocol (i.e., a legacy tone block of 20 MHz). The OFDM tone block 843 has a bandwidth of 20 MHz. The OFDM tone block 844 spans a bandwidth of 40 MHz.

The OFDMA data unit 800, and thus each OFDM data unit 841, 842, 843, and 844, includes a preamble portion 801 and a data portion 516 (e.g., a data field for the corresponding client station), in an embodiment. In other embodiments, at least some of the OFDM data units omit the data portion 516. The preamble portion 801 of each OFDM data unit is generally the same as the preamble of the OFDM data units 500 of FIG. 5. In the embodiment shown in FIG. 8, each of the HEW-SIGB fields 514 includes a respective OFDMA indicator 550. For example, each OFDMA indicator 550 includes the second field with a device identifier for the corresponding device of the first group of multiple devices.

In an embodiment, each 20 MHz sub-band (i.e., a legacy tone block) of the communication channel includes a legacy portion 802 having an L-STF 502, L-LTF 504, and L SIG 506 such that a legacy client station can properly decode the L-SIG field 506 for the 20 MHz sub-band. In the embodiment of FIG. 8, a first legacy tone block 861 spans the OFDM tone blocks 841 and 842, a second legacy tone block 862 spans the OFDM tone block 843, a third legacy tone block 863 spans a portion 844-1 of the OFDM tone block 844, and a fourth legacy tone block 864 spans a portion 844-2 of the OFDM tone block 844. In an embodiment, the legacy portion 802 of the OFDM data units 841 and 842 span a same 20 MHz sub-band (i.e., the legacy tone block 861) and thus overlap in frequency. In this embodiment, the OFDM data units 841 and 842 use a same legacy portion 802.

The L-SIG field 506 corresponding to each legacy tone block 861, 862, 863, and 864 indicates a duration for OFDM data units within the respective legacy tone block, in an embodiment. In some embodiments, the L-SIG fields 506 corresponding to each legacy tone block of the OFDMA data unit 800 have identical values, for example, where the corresponding OFDM data units have a same duration (e.g., due to OFDM symbol padding). In other embodiments, the L-SIG fields 506 of the legacy tone blocks have at least some different values. In an embodiment where channel bonding is used and a client station is assigned multiple OFDM tone blocks, the L-SIG fields corresponding to different 20 MHz sub-bands that contain the OFDM tone blocks assigned to the same client station have a same L-LENGTH value such that each L-LENGTH value decoded by the client station indicates a same packet duration. For example, in the embodiment of FIG. 8, an L-LENGTH value of the L-SIG field 506 of OFDM data units 841 and 843 indicate a same value.

Figure 9:
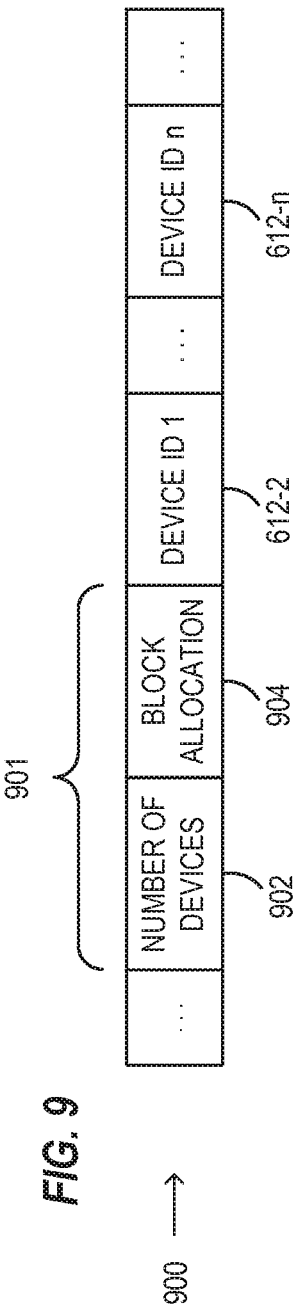
FIG. 9 is a diagram illustrating an example format of a first field and a second field of an OFDMA data unit, according to an embodiment.

FIG. 9 is a diagram illustrating an example format of a first field 901 and a second field 612 of an OFDMA data unit 900, according to an embodiment. The second field 612 is generally the same as the second field 612 of the OFDMA data unit 500 of FIG. 5. In the embodiment shown in FIG. 9, the first field 901 includes a first sub-field 902 and a second sub-field 904 for the selected number of devices n and the codebook index, respectively. In this embodiment, the selected number of devices n and the codebook index are jointly encoded. In an embodiment, the first sub-field 902 has a bit length equal to ceil($\log_2(K)$) that indicates the selected number of devices n.

In various embodiments, the second sub-field 904 includes a number of bits M to indicate the selected block allocation. In an embodiment, the number of bits M is a variable length equal to ceil($\log_2(C(N-1, n-1))$). In this embodiment, the number of bits is based on the selected number of devices n and the maximum number of OFDM tone blocks N. In another embodiment, the number of bits M is a fixed length that is suitable for encoding a longest potential length equal to ceil($\log_2(\max(C(N-1, n-1)))$) for n=1 . . . K, where max( ) is a maximum value function. In this embodiment, unused bits of the second sub-field 904 are undefined or reserved.

In some embodiments, the second sub-field 904 includes a bitmap having a number of bits M, where M is an integer. In an embodiment, the number of bits M is equal to the maximum number of OFDM tone blocks N. In one such embodiment, the bitmap generally includes zeros and uses prefix or postfix coding to indicate a border between assigned tone blocks. As an example, the bitmap generally includes zeros except for a "1" bit of the bitmap corresponding to a last resource assigned to each device of the group of multiple devices. As an example where N=8 and the OFDM tone blocks are assigned with a block allocation {3, 2, 3}, the bitmap is [0, 0, 1, 0, 1, 0, 0, 1]. In other embodiments and/or scenarios, other bit patterns are used to indicate a border between tone blocks for different devices. In an embodiment, the bitmap includes a run of continuous 1s or 0s to indicate a contiguous set of OFDM tone blocks and alternates between the 1s and 0s to indicate a border between tone blocks for different devices. In another embodiment, the bitmap omits a last segment of bits that correspond to the assigned set of OFDM tone blocks for a last device of the group of multiple devices. In this embodiment, the number of bits M for the bitmap is variable and generally less than the maximum number of OFDM tone blocks N. As an example where N=8 and the OFDM tone blocks are assigned with a block allocation {3, 2, 3}, the bitmap is [0, 0, 1, 0, 1] such that a first device is assigned three tone blocks, a second device is assigned two tone blocks, and a third device is inherently assigned a remainder of three tone blocks.

In some embodiments, the codebook 310 and codebook 400 described above generally group together potential block allocations for n scheduled devices and sequentially concatenate those groups. In other embodiments, an alternate codebook such as the codebook 1000 is used, which has block allocations and/or groups stored at least partially in a non-sequential order. In an embodiment, a group of all potential block allocations for n scheduled devices is defined as $\Omega(n)$. As described above, the groups are concatenated as $\Omega(1), \Omega(2), \ldots, \Omega(K)$ where K is the maximum number of devices. In another embodiment, a plurality of potential numbers of devices are selected, which are ordered non-sequentially. In an embodiment, for example, a codebook includes concatenated groups corresponding to $\Omega(n_1), \Omega(n_2), \Omega(n_3), \ldots \Omega(n_K)$ where $n_1=4$, $n_2=3$, $n_3=1$, and $n_4=2$.

In the embodiments described above with respect to FIG. 4, sub-groups are grouped on the basis of having the same value $a_k$ at the k-th step (k=1 ... n). In another embodiment, the sub-groups are grouped on the basis of having the same value a_p(k) at the k-th step, where p(1) ... p(n) is an arbitrary order of 1 ... n. In an embodiment, the orders for groups and/or sub-groups correspond to one or more optimized objectives, for example, minimizing a longest search within the codebook (e.g., codebook 400) or minimizing processing time based on an estimated frequency of use for at least some block allocations. In an embodiment, frequently selected numbers of devices and frequently selected block allocations are placed with lower index values to reduce processing time for decoding (e.g., based on a statistical distribution of prior resource allocations).

In other embodiments, the second sub-field 904 includes a bitmap that indicates a number of OFDM tone blocks for each device in a group of multiple devices, where the number of OFDM tone blocks is selected from a plurality of potential numbers of OFDM tone blocks. In an embodiment, for example, a plurality of potential numbers of OFDM tone blocks includes numbers {1, 2, 4, 13} for N=21. In this embodiment, a block allocation of {4, 2, 2, 3} indicates that a first device is assigned 13 tone blocks, a second device is assigned two tone blocks, a third device is assigned two tone blocks, and a fourth device is assigned four tone blocks. The block allocation of {4, 2, 2, 3} is indicated in the bitmap as [00001100111]. In an embodiment, the AP 14 is configured to use an iterative encoding algorithm where a block allocation A is initialized and a suitable number of bits are added for each device of the selected number of devices. The AP 14 initializes the block allocation A=[ ] (i.e., a null set) and for i=1 to n, a selected number of blocks for the i-th device is $n_{t(i)}$. The AP 14 populates the block allocation as A=[A b b b ... b] where b is the inverse of the last entry of A and the number of b's to be added is equal to t(i). In this embodiment, a device that receives the bitmap translates each contiguous bit (i.e., having a same sign as a previous bit) into a number t. Upon a sign change, the device determines that a block allocation of $n_t$ blocks has been scheduled and continues translating and determining until a sum of the allocated blocks is equal to the maximum number of OFDM tone blocks N.

In another embodiment, the second sub-field 904 includes a bitmap that indicates an index to a plurality of potential numbers of OFDM tone blocks. In an embodiment, for example, a plurality of potential numbers of OFDM tone blocks includes numbers {1, 2, 4, 13}. Instead of multiple contiguous "0"s+a single "1" for the number of block, the AP encodes multiple contiguous "0"s+a single "1" that indicate an index of the potential numbers of OFDM tone blocks. In this embodiment, a block allocation of {13, 2, 4} is indicated in the bitmap as [000101001].

In some embodiments, potential numbers of block allocations correspond to individual sub-carriers or tones within a communication channel. In an embodiment, a plurality of potential numbers of tones includes {26, 56, 114, 242, 484}. During encoding and decoding, the AP and/or client device is configured to use an index to the plurality of potential numbers of tones without requiring an additional step of multiplying a number of OFDM tone blocks by a number of tones per tone block.

Figure 10:
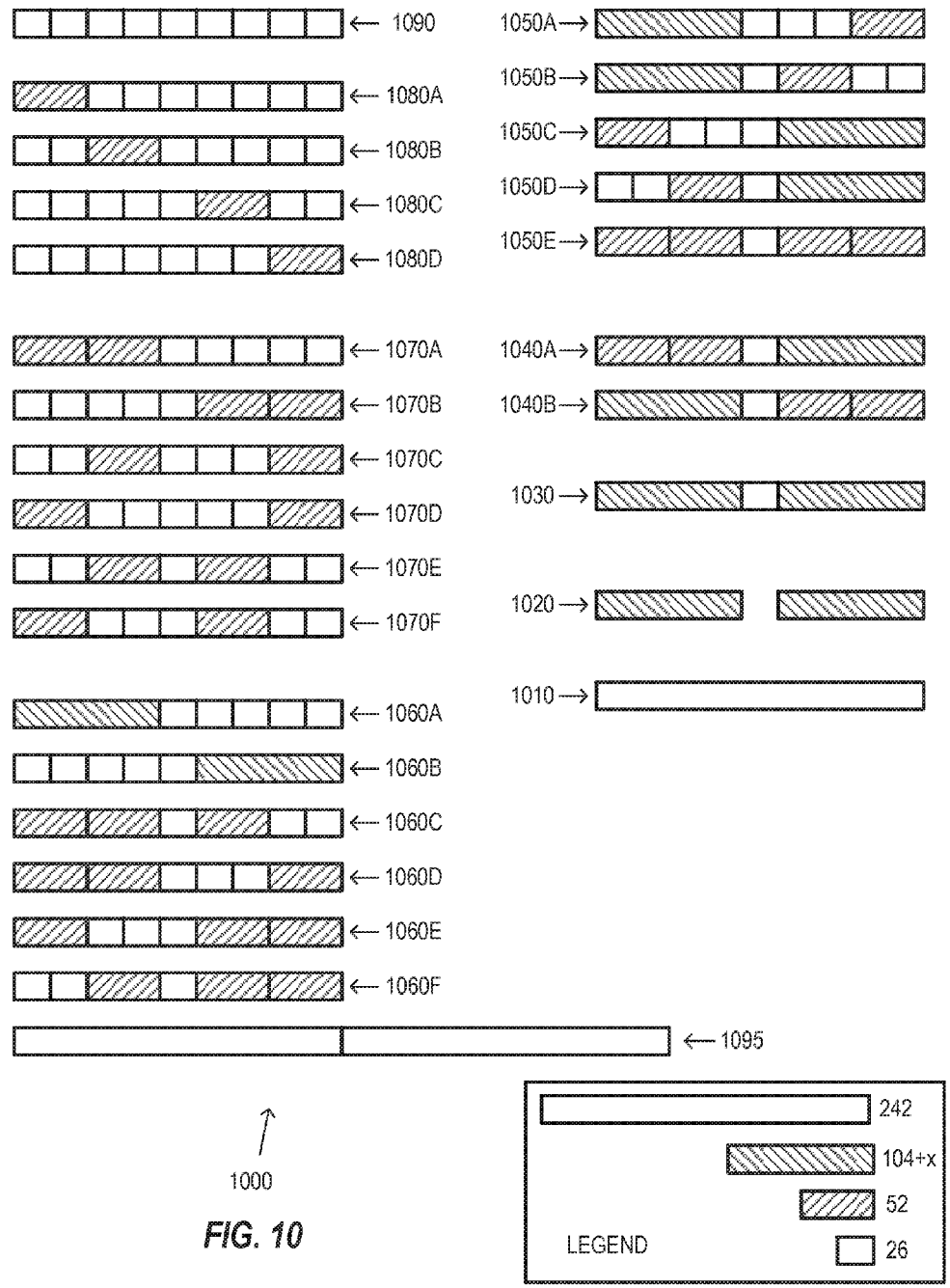
FIG. 10 is a diagram illustrating an example codebook for allocation of OFDM sub-channel blocks, according to an embodiment.

FIG. 10 is a diagram illustrating an example codebook 1000 for allocation of OFDM tone blocks, according to an embodiment. In some embodiments, the codebook 1000 includes fixed sizes of sets of OFDM tone blocks that can be allocated: 26×1, 26×2, 26×4+x, 242, 242×2. In an embodiment, each set of OFDM tone blocks for the codebook 1000 can only be scheduled on designated sub-carriers. In the embodiment shown in FIG. 10, the codebook 1000 includes sets of block allocations 1010, 1020, 1030, 1040, 1050, 1060, 1070, 1080, and 1090 for n=1 ... 9. Each set of block allocations indicates all valid allocations of Ω(n) within a span of 20 MHz. In some embodiments, one or more block allocations which are not fully assigned are also included as a special case for flexibility in allocating the OFDM tone blocks.

In an embodiment, the codebook 1000 is configured as a lookup table for all potential block allocations for each 20 MHz span of the communication channel, with special entries for a 242×2 block allocation. In the embodiment of FIG. 10, the lookup table has 28 entries which are represented by an index having 5 bits. The AP 14 encodes 5 bits as a codebook index for each span of 20 MHz of the communication channel, in an embodiment. In an embodiment, the AP 14 encodes the 5 bits with the special entry to indicate that a 40 MHz span is scheduled to a single device. In this embodiment, signaling for an adjacent 20 MHz is omitted.

In another embodiment, the special entry in the lookup table indicates that the corresponding 242 tones belong to a 242×2 allocation (e.g., a 40 MHz span). In this embodiment, the client device determines which adjacent 20 MHz spans are scheduled together by decoding the special entry in the adjacent 20 MHz spans (i.e., a 20 MHz span to the left and a 20 MHz span to the right). In yet another embodiment, a 40 MHz span is encoded jointly, for example, using concatenated two 20 MHz lookup table and the special entry for 242×2. In this embodiment, the lookup table includes 27 entries for each 20 MHz span and the special entry for 242×2, for a total of 730 entries which are represented with an index having 10 bits.

Figure 11:
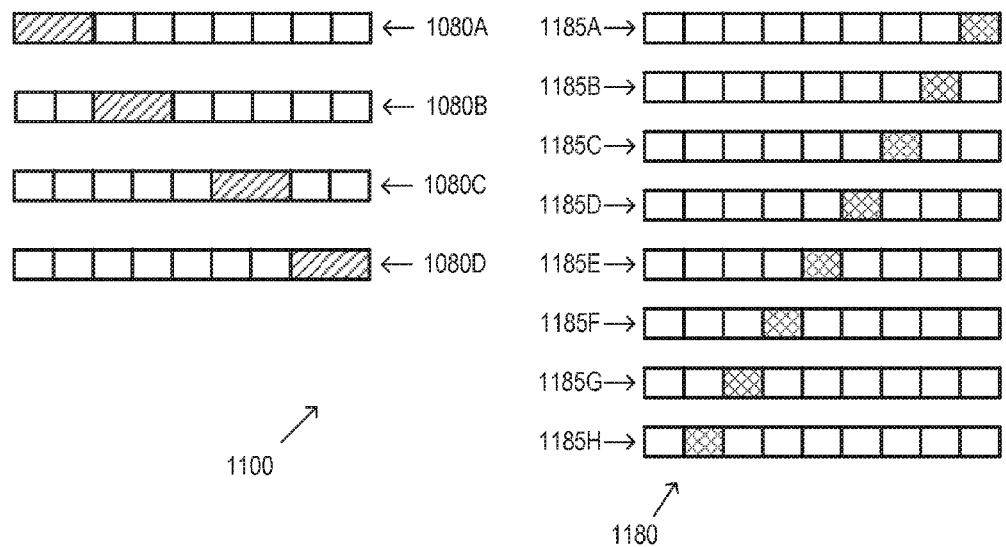
FIG. 11 is a diagram illustrating an example set of block allocations for a codebook, according to an embodiment.

As described above, in some embodiments, each block allocation 302 corresponds to an assignment of a predetermined maximum number of OFDM tone blocks of the WLAN communication channel. In other embodiments, at least some block allocations 302 include an unassigned tone block, for example, nine out of ten OFDM tone blocks are assigned for a block allocation. FIG. 11 is a diagram illustrating an example set of block allocations 1100 for a codebook (not shown), according to an embodiment. The set of block allocations 1100 is generally similar to the set of block allocations 1080 as shown in FIG. 10; however, the set of block allocations 1100 also includes one or more unassigned allocations 1180 for block allocations 1185 in the lookup table. For example, the set of potential block allocations 1100 for n=8 includes 7×(26×1)+1×(26×2) and also 8×(26×1) with one unassigned 26×1 tone block.

Figure 12:
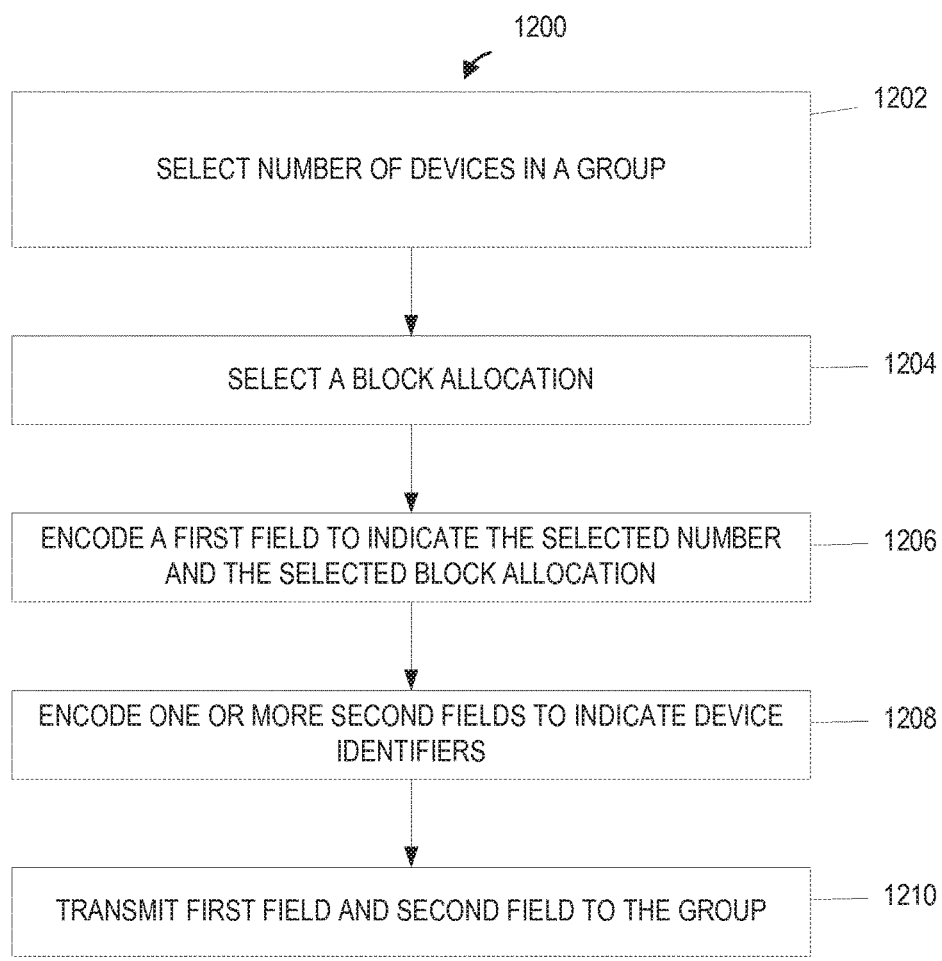
FIG. 12 is a flow diagram of an example method for encoding a first field to indicate both a selected number of devices in a group and a selected block allocation, according to an embodiment.

FIG. 12 is a flow diagram of an example method 1200 for encoding a first field to indicate both a selected number of devices in a group and a selected block allocation, according to an embodiment. With reference to FIG. 1, the method 1200 is implemented by the network interface 16, in an embodiment. For example, in one such embodiment, the PHY processing unit 20 is configured to implement the method 1200. According to another embodiment, the MAC processing 18 is also configured to implement at least a part of the method 1200. With continued reference to FIG. 1, in yet another embodiment, the method 1200 is implemented by the network interface 27 (e.g., the PHY processing unit 29 and/or the MAC processing unit 28). In other embodiments, the method 1200 is implemented by other suitable network interfaces.

At block 1202, a number of devices in a group of multiple devices to which a first OFDMA data unit is to be transmitted is selected, in an embodiment. In some embodiments, the codebook corresponds to the codebook 312, 400, or 1000 as described above with respect to FIGS. 3, 4, and 10. In some embodiments, the OFDMA data unit corresponds to the OFDMA data unit 500, 650, 750, 800, or 900, as described above with respect to FIGS. 5, 6, 7, 8, and 9.

At block 1204, a block allocation is selected that indicates respective integer numbers of different tone blocks of a WLAN communication channel to be assigned to each device in the group of multiple devices, in an embodiment.

At block 1206, a first field is encoded to indicate both the selected number of devices in the group and the selected block allocation, in an embodiment. In some embodiments, encoding the first field includes determining a single index to a codebook, such as the codebook 312, 400, or 1000 as described above with respect to FIGS. 3, 4, and 10, that indicates both the selected number of devices in the group and the selected block allocation.

At block 1208, one or more second fields are encoded to indicate a respective device identifier for each device in the group of multiple devices, in an embodiment.

At block 1210, the first field and the one or more second fields are transmitted to each device in the group of multiple devices, in an embodiment.

Figure 13:
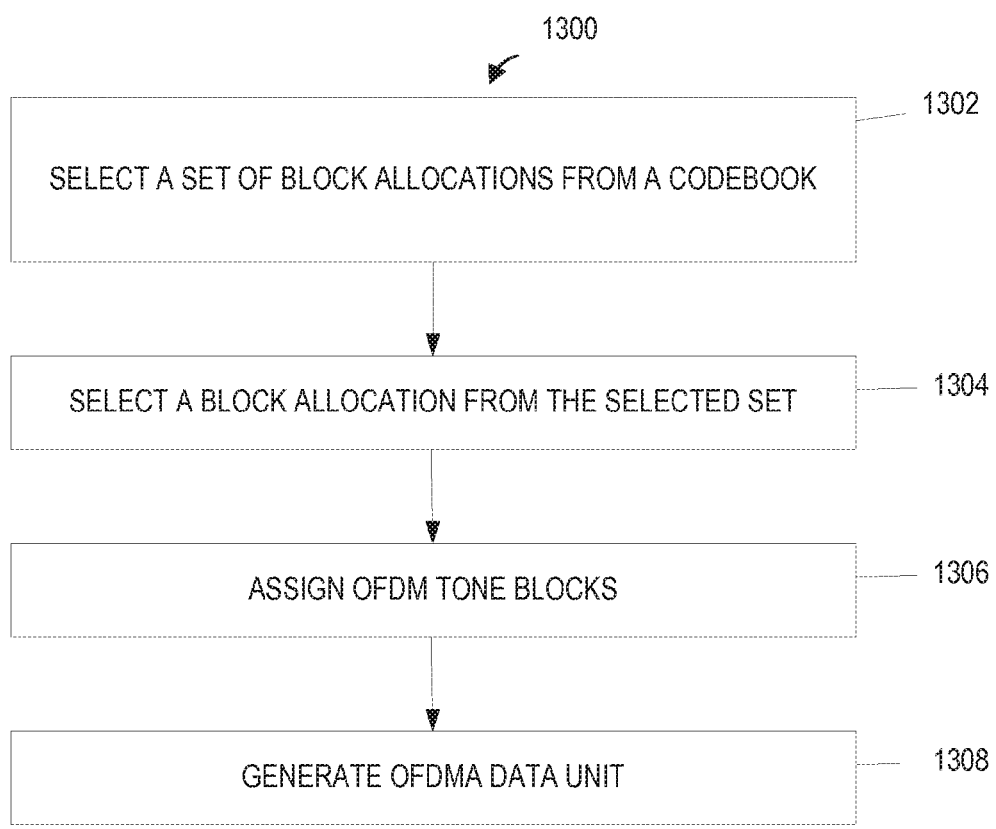
FIG. 13 is a flow diagram of an example method for generating an OFDMA data unit, according to an embodiment.

FIG. 13 is a flow diagram of an example method 1300 for generating an OFDMA data unit, according to an embodiment. With reference to FIG. 1, the method 1300 is implemented by the network interface 16, in an embodiment. For example, in one such embodiment, the PHY processing unit 20 is configured to implement the method 1300. According to another embodiment, the MAC processing 18 is also configured to implement at least a part of the method 1300. With continued reference to FIG. 1, in yet another embodiment, the method 1300 is implemented by the network interface 27 (e.g., the PHY processing unit 29 and/or the MAC processing unit 28). In other embodiments, the method 1300 is implemented by other suitable network interfaces.

At block 1302, a set of block allocations is selected from a codebook for a first group of devices having a first group size of a plurality of potential group sizes, in an embodiment. In some embodiments, the codebook corresponds to the codebook 312, 400, or 1000 as described above with respect to FIGS. 3, 4, and 10. The codebook has respective sets of block allocations corresponding to each of the plurality of potential group sizes, in an embodiment. The selected set of block allocations is selected to correspond to the first group size, in an embodiment.

At block 1304, a block allocation for the first group of devices is selected from the selected set of block allocations, in an embodiment. The selected block allocation indicates a respective set of OFDM tone blocks to be assigned to each device of the first group of devices and each set of OFDM tone blocks indicates a respective integer number of different OFDM tone blocks of a WLAN communication channel, in an embodiment.

At block 1306, the corresponding integer number of different OFDM tone blocks of the selected block allocation are assigned to each device of the first group of devices, in an embodiment. The selected block allocation includes at least i) a first set of OFDM tone blocks assigned to a first device of the first group of devices and ii) a second set of OFDM tone blocks assigned to a second device of the first group of devices, in an embodiment.

At block 1308, an OFDMA data unit is generated to be transmitted to the first group of devices via the WLAN communication channel using the assigned set of OFDM tone blocks, in an embodiment. The OFDMA data unit includes a preamble portion and a data portion, the preamble portion having an index to the codebook that indicates i) the first group size, and ii) the selected block allocation, in an embodiment. In some embodiments, the OFDMA data unit corresponds to the OFDMA data unit 500, 650, 750, 800, or 900, as described above with respect to FIGS. 5, 6, 7, 8, and 9.

Figure 14:
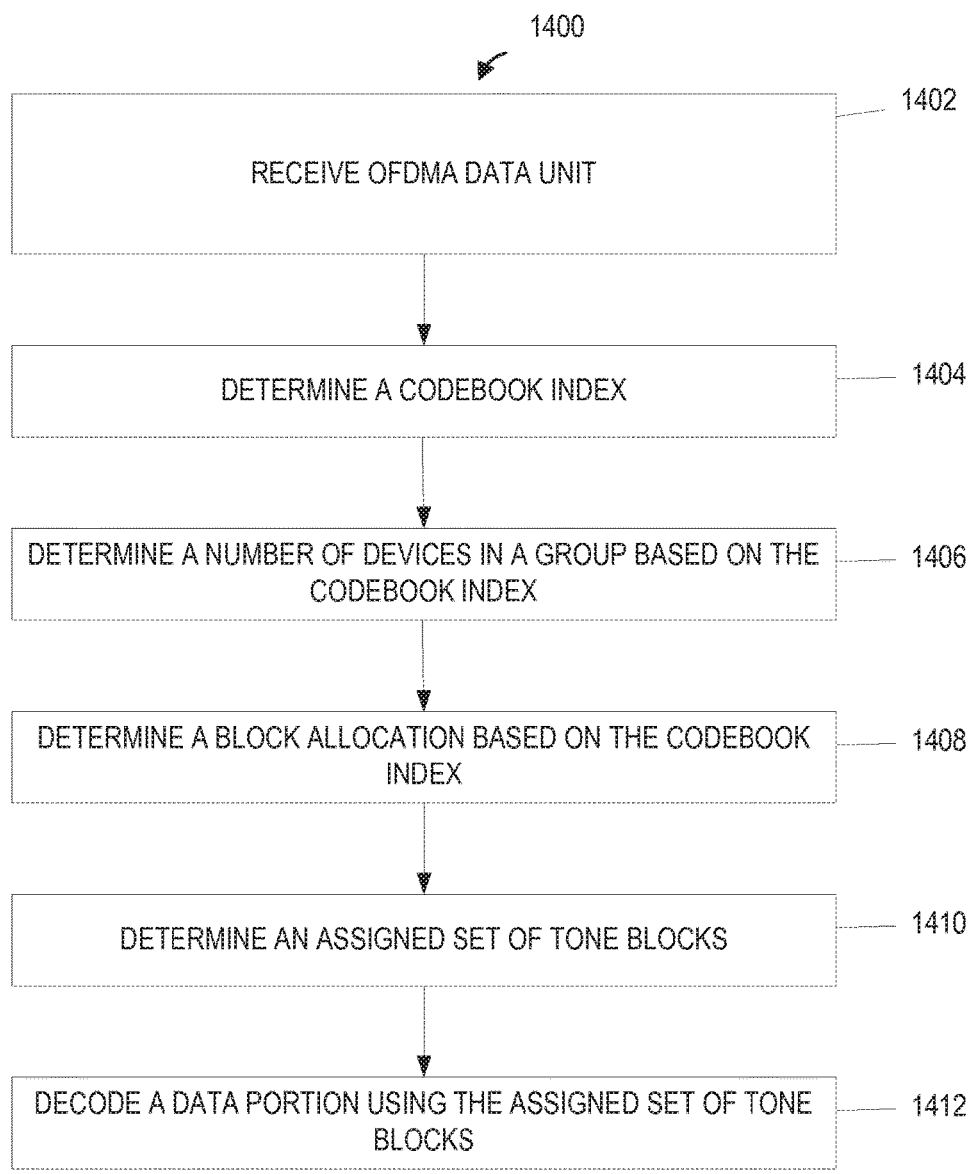
FIG. 14 is a flow diagram of an example method for decoding a data portion of an OFDMA data unit, according to an embodiment.

FIG. 14 is a flow diagram of an example method 1400 for decoding a data portion of an OFDMA data unit, according to an embodiment. With reference to FIG. 1, the method 1400 is implemented by the network interface 16, in an embodiment. For example, in one such embodiment, the PHY processing unit 20 is configured to implement the method 1400. According to another embodiment, the MAC processing 18 is also configured to implement at least a part of the method 1400. With continued reference to FIG. 1, in yet another embodiment, the method 1400 is implemented by the network interface 27 (e.g., the PHY processing unit 29 and/or the MAC processing unit 28). In other embodiments, the method 1400 is implemented by other suitable network interfaces.

At block 1402, an OFDMA data unit is received via a WLAN communication channel, in an embodiment. In some embodiments, the OFDMA data unit corresponds to the OFDMA data unit 500, 650, 750, 800, or 900, as described above with respect to FIGS. 5, 6, 7, 8, and 9.

At block 1404, a non-legacy signal field of the OFDMA data unit is decoded to determine a codebook index, in an embodiment. In some embodiments, the codebook index corresponds to the codebook index for the codebook 312, 400, or 1000 as described above with respect to FIGS. 3, 4, and 10.

At block 1406, a number of devices in a group of devices associated with the OFDMA data unit is determined based on the codebook index, in an embodiment.

At block 1408, a block allocation is determined based on the codebook index. The block allocation indicates respective sets of OFDM tone blocks for the WLAN communication channel that are assigned to each device of the group of devices, in an embodiment.

At block 1410, an assigned set of OFDM tone blocks is determined based on the block allocation, in an embodiment.

At block 1412, a data portion of the OFDMA data unit is decoded using the assigned set of OFDM tone blocks, in an embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
    selecting, for a first group of devices having a first group size of a plurality of potential group sizes, a set of block allocations from a codebook, the codebook having respective sets of block allocations corresponding to each of the plurality of potential group sizes, wherein the selected set of block allocations is selected to correspond to the first group size;
    selecting a block allocation for the first group of devices from the selected set of block allocations, the selected block allocation indicating a respective set of orthogonal frequency division multiplexing (OFDM) tone blocks to be assigned to each device of the first group of devices, each set of OFDM tone blocks indicating a respective integer number of different OFDM tone blocks of a wireless local area network (WLAN) communication channel, wherein selecting the block allocation comprises selecting the integer number of different OFDM tone blocks from a numerically ordered set of integers having at least two non-sequential integer values;
    assigning, to each device of the first group of devices, the corresponding integer number of different OFDM tone blocks of the selected block allocation, wherein the selected block allocation includes at least i) a first set of OFDM tone blocks assigned to a first device of the first group of devices and ii) a second set of OFDM tone blocks assigned to a second device of the first group of devices; and
    generating an orthogonal frequency division multiple access (OFDMA) data unit to be transmitted to the first group of devices via the WLAN communication channel using the assigned set of OFDM tone blocks, the OFDMA data unit including a preamble portion and a data portion, the preamble portion having an index to the codebook that indicates i) the first group size, and ii) the selected block allocation.

2. The method of claim 1, wherein each of the sets of OFDM tone blocks to be assigned indicates a contiguous block of OFDM tones.

3. The method of claim 1, wherein the preamble portion includes a sub-field, having a respective device identifier, for each device of the first group of devices in a same order as the sets of OFDM tone blocks of the selected block allocation.

4. The method of claim 1, wherein generating the OFDMA data unit comprises iteratively determining the index to the codebook.

5. The method of claim 4, wherein iteratively determining the index to the codebook comprises performing a plurality of lookups into a table of binomial coefficients.

6. The method of claim 5, wherein:
    iteratively determining the index comprises determining the index as $$I = \sum_{k=1}^{n-1} C(N-1, k-1) + \sum_{i=1}^{n-1} \sum_{t=1}^{a_i-1} C\left(N - \sum_{j=1}^{i-1} a_j - t, n - i - 1\right)$$

where I is the index, n is the first group size, $a_3$ is a value of the j-th integer number of different tone blocks for the selected block allocation, and j is an index, and
    the codebook corresponds to an ordered list of the block allocations of the sets of block allocations for the plurality of potential group sizes.

7. The method of claim 1, further comprising concurrently receiving i) a first portion of a subsequent OFDMA data unit from the first device using the first set of OFDM tone blocks, and ii) a second portion of the subsequent OFDMA data unit from the second device using the second set of OFDM tone blocks.

8. The method of claim 1, wherein:
    each set of block allocations of the codebook includes block allocations that span a same bandwidth BW,
    the WLAN communication channel spans a bandwidth m*BW, where m is a suitable positive integer, and
    selecting the block allocation for the first group of devices comprises selecting m block allocations from the codebook for the first group of devices.

9. The method of claim 1, wherein each OFDM tone block includes a single OFDM sub-carrier.

10. An apparatus, comprising:
    a network interface device having one or more integrated circuits configured to:
        select, for a first group of devices having a first group size of a plurality of potential group sizes, a set of block allocations from a codebook, the codebook having respective sets of block allocations corresponding to each of the plurality of potential group sizes, wherein the selected set of block allocations is selected to correspond to the first group size,
        select a block allocation for the first group of devices from the selected set of block allocations, the selected block allocation indicating a respective set of orthogonal frequency division multiplexing (OFDM) tone blocks to be assigned to each device of the first group of devices, each set of OFDM tone blocks indicating a respective integer number of different OFDM tone blocks of a wireless local area network (WLAN) communication channel, wherein selecting the block allocation comprises selecting the integer number of different OFDM tone blocks from a numerically ordered set of integers having at least two non-sequential integer values,
        assign, to each device of the first group of devices, the corresponding integer number of different OFDM tone blocks of the selected block allocation, wherein the selected block allocation includes at least i) a first OFDM tone block set assigned to a first device of the first group of devices and ii) a second OFDM tone block set assigned to a second device of the first group of devices, and
        generate an orthogonal frequency division multiple access (OFDMA) data unit to be transmitted to the first group of devices via the WLAN communication channel using the assigned OFDM tone block sets, the OFDMA data unit including a preamble portion and a data portion, the preamble portion having an index to the codebook that indicates i) the first group size, and ii) the selected block allocation.

11. The apparatus of claim 10, wherein each set of OFDM tone blocks to be assigned indicates a contiguous block of OFDM tones.

12. The apparatus of claim 10, wherein the preamble portion includes a sub-field, having a respective device identifier, for each device of the first group of devices in a same order as the sets of OFDM tone blocks of the selected block allocation.

13. The apparatus of claim 10, wherein:
the one or more integrated circuits are configured to iteratively determine the index as $$I = \sum_{k=1}^{n-1} C(N-1, k-1) + \sum_{i=1}^{n-1} \sum_{t=1}^{a_i-1} C\left(N - \sum_{j=1}^{i-1} a_j - t, n-i-1\right)$$

where I is the index, n is the first group size, $a_j$ is a value of the j-th integer number of different tone blocks for the selected block allocation, and j is an index, and
the codebook corresponds to an ordered list of the block allocations of the sets of block allocations for the plurality of potential group sizes.

14. The apparatus of claim 10, wherein the one or more integrated circuits are configured to concurrently receive i) a first portion of a subsequent OFDMA data unit from the first device using the first OFDM tone block set, and ii) a second portion of the subsequent OFDMA data unit from the second device using the second OFDM tone block set.

15. A method, comprising:
receiving an orthogonal frequency division multiple access (OFDMA) data unit via a wireless local area network (WLAN) communication channel;
decoding a non-legacy signal field of the OFDMA data unit to determine a codebook index;
determining a number of devices in a group of devices associated with the OFDMA data unit based on the codebook index;
determining a block allocation based on the codebook index, the block allocation indicating respective sets of OFDM tone blocks for the WLAN communication channel that are assigned to each device of the group of devices, wherein each set of OFDM tone blocks indicates a respective integer number of different OFDM tone blocks of the WLAN communication channel, and the integer number of different OFDM tone blocks is selected from a numerically ordered set of integers having at least two non-sequential integer values;
determining an assigned set of OFDM tone blocks based on the block allocation; and
decoding a data portion of the OFDMA data unit using the assigned set of OFDM tone blocks.

16. The method of claim 15, wherein determining the number of devices comprises iteratively comparing the codebook index with a size of a set of block allocations, the set of block allocations including block allocations having a same number of sets of OFDM tone blocks.

17. The method of claim 16, wherein determining the block allocation comprises iteratively determining a set of OFDM tone blocks for each device of the group of multiple devices based on the codebook index.

18. The method of claim 15, further comprising transmitting a subsequent OFDMA data unit using the assigned tone block set.

19. An apparatus, comprising:
a network interface device having one or more integrated circuits configured to:
receive an orthogonal frequency division multiple access (OFDMA) data unit via a wireless local area network (WLAN) communication channel,
decode a non-legacy signal field of the OFDMA data unit to determine a codebook index,
determine a number of devices in a group of devices associated with the OFDMA data unit based on the codebook index,
determine a block allocation based on the codebook index, the block allocation indicating respective sets of OFDM tone blocks for the WLAN communication channel that are assigned to each device of the group of devices, wherein each set of OFDM tone blocks indicates a respective integer number of different OFDM tone blocks of the WLAN communication channel, and the integer number of different OFDM tone blocks is selected from a numerically ordered set of integers having at least two non-sequential integer values,
determine an assigned set of OFDM tone blocks based on the block allocation, and
decode a data portion of the OFDMA data unit using the assigned set of OFDM tone blocks.

20. The apparatus of claim 19, wherein determining the number of devices comprises iteratively comparing the codebook index with a size of a set of block allocations, the set of block allocations including block allocations having a same number of sets of OFDM tone blocks.

21. The apparatus of claim 20, wherein determining the block allocation comprises iteratively determining a set of OFDM tone blocks for each device of the group of multiple devices based on the codebook index.

22. The apparatus of claim 19, further comprising transmitting a subsequent OFDMA data unit using the assigned tone block set.

* * * * *